United States Patent
Yamasaki et al.

(10) Patent No.: US 11,160,286 B2
(45) Date of Patent: Nov. 2, 2021

(54) METHOD FOR PRODUCING DISINFECTED LIVER

(71) Applicants: Shinji Yamasaki, Izumisano (JP); Osaka Nanko Zoki Japan, Ltd., Osaka (JP); Fuso Pharmaceutical Industries, Ltd., Osaka (JP)

(72) Inventors: Shinji Yamasaki, Izumisano (JP); Atsushi Hinenoya, Izumisano (JP); Iwao Morikochi, Izumisano (JP); Mamoru Yamaguchi, Osaka (JP); Yukitoshi Sakuramoto, Osaka (JP); Kazumasa Nishida, Osaka (JP); Masahiro Asakura, Osaka (JP)

(73) Assignees: Shinji Yamasaki, Osaka (JP); OSAKA NANKO ZOKI JAPAN, LTD., Osaka (JP); FUSO PHARMACEUTICAL INDUSTRIES, LTD., Osaka (JP)

(*) Notice: Subject to any disclaimer, the term of this patent is extended or adjusted under 35 U.S.C. 154(b) by 0 days.

(21) Appl. No.: 16/257,766

(22) Filed: Jan. 25, 2019

(65) Prior Publication Data

US 2019/0159468 A1 May 30, 2019

Related U.S. Application Data

(63) Continuation of application No. 14/404,627, filed as application No. PCT/JP2013/065144 on May 31, 2013, now abandoned.

(30) Foreign Application Priority Data

Jun. 1, 2012 (JP) .................................. 2012-125793

(51) Int. Cl.
| | | |
|---|---|---|
| A23L 13/20 | (2016.01) | |
| A23B 4/09 | (2006.01) | |
| A23B 4/24 | (2006.01) | |
| A23B 4/06 | (2006.01) | |
| A23B 4/08 | (2006.01) | |

(52) U.S. Cl.
CPC ................ *A23B 4/09* (2013.01); *A23B 4/06* (2013.01); *A23B 4/08* (2013.01); *A23B 4/24* (2013.01); *A23L 13/20* (2016.08); *A23V 2002/00* (2013.01)

(58) Field of Classification Search
USPC ................................................. 426/281, 335
See application file for complete search history.

(56) References Cited

U.S. PATENT DOCUMENTS

| | | | |
|---|---|---|---|
| 3,819,329 A | * | 6/1974 | Kaestner ................ A01N 59/00 422/3 |
| 4,663,173 A | | 5/1987 | Clatfelter et al. |
| 6,569,482 B2 | | 5/2003 | Schaefer et al. |
| 8,677,892 B2 | | 3/2014 | Misawa et al. |
| 2002/0122854 A1 | | 9/2002 | Danner et al. |
| 2003/0047087 A1 | | 3/2003 | Phebus et al. |
| 2006/0070959 A1 | | 4/2006 | Perkins et al. |
| 2009/0081317 A1 | | 3/2009 | McNaughton et al. |
| 2011/0200688 A1 | | 8/2011 | Harvey et al. |
| 2011/0311691 A1 | | 12/2011 | Gutzmann et al. |

FOREIGN PATENT DOCUMENTS

| | | |
|---|---|---|
| JP | H1189509 A | 4/1999 |
| JP | 200416189 A | 1/2004 |
| JP | 2008525437 A | 7/2008 |
| WO | 2006071215 A1 | 7/2006 |

OTHER PUBLICATIONS

Survey Results Regarding Bovine Liver *E. coli* O157 and Campylobacter Contamination Feb. 24, 2012 No. 4.
<Information Relating to the Featured Article> Ups and downs of Enterohemorrhagic *Escherichia coli* in Seared Beef vol. 23 No. 6 2002.6 141-2.
Regarding Additional Information Relating to Material for the Previous Section Meeting (Study Results Regarding Bovine Liver *E. coli* and Campylobacter Contamination) Mar. 30, 2012.

* cited by examiner

*Primary Examiner* — Lien T Tran
(74) *Attorney, Agent, or Firm* — Saliwanchik, Lloyd & Eisenschenk

(57) ABSTRACT

The present invention has demonstrated that microorganisms present in a liver can be killed by washing the bile duct and the portal vein with hot water, and then disinfecting the liver using a chlorine-based disinfectant. It has also been demonstrated that sterilizing effects can be enhanced by freezing the liver after disinfection with a chlorine-based disinfectant.

4 Claims, 14 Drawing Sheets

FIG. 2A
FIG. 2B
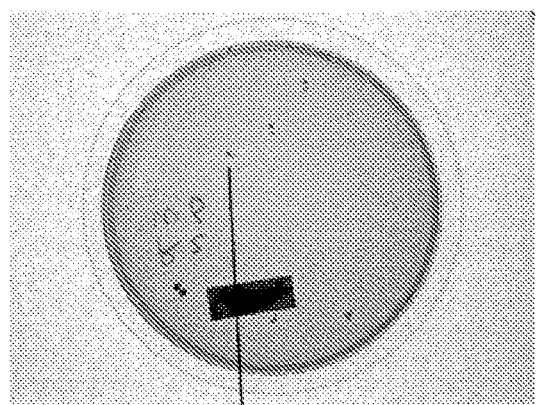
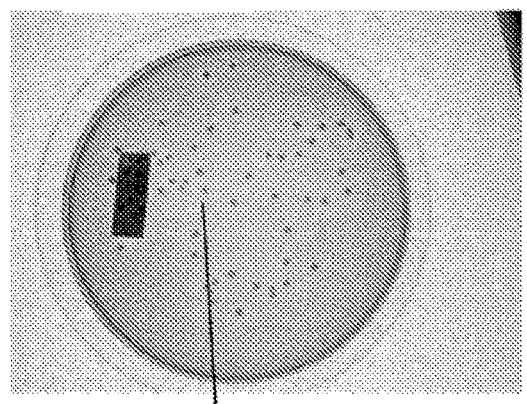
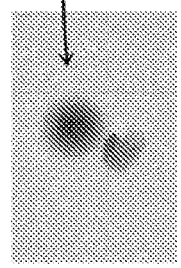
FIG. 2C
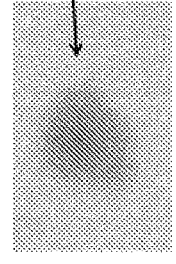
FIG. 2D
A, C: Colony shape of the untreated group   B, D: Colony shape of the chlorine-treated group (2,000 ppm)

18. Portal vein; 21. Postcava; 22. Hepatic duct; 23. Cystic duct; 24. Hepatocystic duct; 25. Common bile duct; 27. Gallbladder Table 8 - Disinfection effects by Eva water

| Disinfection treatment | Liver No. | Site No. | cfu/g |
|---|---|---|---|
| Eva water 500ppm 500 mL | 1 | A1 | $9.13 \times 10^4$ |
| | | B1 | $3.65 \times 10^4$ |
| | | C1 | $>6.00 \times 10^4$ |
| | | D1 | $>6.00 \times 10^4$ |
| +Freezing | | A2 | $1.27 \times 10^2$ |
| | | B2 | $1.33 \times 10^2$ |
| | | C2 | $6.67 \times 10^1$ |
| | | D2 | $8.00 \times 10^1$ |
| Eva water 500ppm 500 mL | 2 | A1 | $7.17 \times 10^4$ |
| | | B1 | $1.57 \times 10^4$ |
| | | C1 | $7.65 \times 10^4$ |
| | | D1 | $>6.00 \times 10^4$ |
| +Freezing | | A2 | $1.80 \times 10^2$ |
| | | B2 | $8.00 \times 10^1$ |
| | | C2 | $1.60 \times 10^2$ |
| | | D2 | $1.27 \times 10^2$ |
| Eva water 500ppm 500 mL | 3 | A1 | $2.02 \times 10^4$ |
| | | B1 | $1.31 \times 10^4$ |
| | | C1 | $2.60 \times 10^4$ |
| | | D1 | $6.41 \times 10^4$ |
| +Freezing | | A2 | $3.33 \times 10^1$ |
| | | B2 | $8.00 \times 10^1$ |
| | | C2 | $8.00 \times 10^1$ |
| | | D2 | $1.33 \times 10^1$ |

FIG. 11

Table 9 - Disinfection effects by V-INAC

| Disinfection treatment | Liver No. | Site No. | cfu/g |
|---|---|---|---|
| V-INAC 500 ppm 500 mL | 1 | A1 | $9.07 \times 10^3$ |
| | | B1 | $1.79 \times 10^4$ |
| | | C1 | $1.91 \times 10^4$ |
| | | D1 | $5.51 \times 10^4$ |
| + Freezing | | A2 | $3.33 \times 10^1$ |
| | | B2 | $2.00 \times 10^1$ |
| | | C2 | $1.33 \times 10^1$ |
| | | D2 | $2.67 \times 10^1$ |
| V-INAC 500 ppm 500 mL | 2 | A1 | $3.48 \times 10^4$ |
| | | B1 | $3.47 \times 10^4$ |
| | | C1 | $7.09 \times 10^4$ |
| | | D1 | $>6.00 \times 10^4$ |
| + Freezing | | A2 | $3.13 \times 10^2$ |
| | | B2 | $1.07 \times 10^2$ |
| | | C2 | $4.00 \times 10^2$ |
| | | D2 | $8.00 \times 10^1$ |

FIG. 12

Table 10 - Disinfection effects by Teruron Bleach

| Disinfection treatment | Liver No. | Site No. | cfu/g |
|---|---|---|---|
| Teruron Bleach 500 ppm 500 mL | 1 | A1 | >6.00 x $10^4$ |
| | | B1 | 7.63 x $10^4$ |
| | | C1 | 4.79 x $10^4$ |
| | | D1 | 1.06 x $10^5$ |
| + Freezing | | A2 | 1.13 x $10^2$ |
| | | B2 | 1.13 x $10^2$ |
| | | C2 | 1.40 x $10^2$ |
| | | D2 | 8.00 x $10^1$ |
| Teruron Bleach 500 ppm 500 mL | 2 | A1 | 4.56 x $10^4$ |
| | | B1 | >6.00 x $10^4$ |
| | | C1 | 6.03 x $10^4$ |
| | | D1 | 5.92 x $10^4$ |
| + Freezing | | A2 | 1.20 x $10^2$ |
| | | B2 | 1.87 x $10^2$ |
| | | C2 | 1.27 x $10^2$ |
| | | D2 | 1.13 x $10^2$ |
| Teruron Bleach 500 ppm 500 mL | 3 | A1 | 5.17 x $10^4$ |
| | | B1 | >6.00 x $10^4$ |
| | | C1 | >6.00 x $10^4$ |
| | | D1 | >6.00 x $10^4$ |
| + Freezing | | A2 | 1.87 x $10^2$ |
| | | B2 | 1.40 x $10^2$ |
| | | C2 | 1.53 x $10^2$ |
| | | D2 | 8.67 x $10^1$ |

FIG. 13

Table 11 - Disinfection effects by combined use of V-INAC and Eva water

| Disinfection treatment | Liver No. | Site No. | cfu/g |
|---|---|---|---|
| V-INAC 500 ppm 300 mL +Eva water 500ppm 300 mL | 1 | A1 | $5.89 \times 10^4$ |
| | | B1 | $5.68 \times 10^4$ |
| | | C1 | $2.58 \times 10^4$ |
| | | D1 | $4.08 \times 10^4$ |
| + Freezing | | A2 | $2.67 \times 10^1$ |
| | | B2 | $4.00 \times 10^1$ |
| | | C2 | $4.00 \times 10^1$ |
| | | D2 | $2.00 \times 10^1$ |
| Eva water 500ppm 300 mL +V-INAC 500 ppm 300 mL | 2 | A1 | $1.57 \times 10^4$ |
| | | B1 | $3.71 \times 10^4$ |
| | | C1 | $6.34 \times 10^4$ |
| | | D1 | $1.43 \times 10^4$ |
| + Freezing | | A2 | $2.20 \times 10^2$ |
| | | B2 | $1.40 \times 10^2$ |
| | | C2 | $1.87 \times 10^2$ |
| | | D2 | $5.33 \times 10^1$ |

FIG. 14

METHOD FOR PRODUCING DISINFECTED LIVER

CROSS REFERENCE TO A RELATED APPLICATION

This application is a Continuation Application of Ser. No. 14/404,627, filed Nov. 30, 2014 Now Abandon; which is a National Stage Application of International Application Number PCT/JP2013/065144, filed May 31, 2013; which claims priority to Japanese Patent Application No. 2012-125793, filed Jun. 1, 2012, all of which are incorporated herein by reference in their entirety.

TECHNICAL FIELD

The present invention relates to disinfection treatment methods for providing safe food for raw consumption. Specifically, it relates to sterilization methods against food-poisoning bacteria present in food, by washing the food with hot water, and disinfecting and freezing it. Furthermore, the present invention relates to methods for producing sterilized foods.

BACKGROUND ART

The liver contains an abundance of vitamin A, B vitamins, iron, folic acid, and such. In particular, folic acid and iron facilitate hematopoiesis, and therefore liver is said to be an ideal food for preventing anemia and for those in need of a large amount of iron intake such as pregnant women. Liver is an ingredient that has been taken from long ago as therapeutic food for liver diseases and such, because its quality proteins regenerate liver cells, and its vitamins and minerals have an effect of activating liver function. As compared to cooked liver, raw liver is a particularly nutritious ingredient since nutrients such as vitamins are not deactivated by heat. It is believed that eating raw liver has spread throughout Japan because raw food culture has always existed in Japan and people are not reluctant to eat raw liver in barbecue cuisine, which was introduced from Korea and other countries. However, since various food-poisoning bacteria are present in bovine liver, food poisoning occurs on rare occasions and this has become a social issue.

It is well known that *Campylobacter*, a food poisoning bacterium, is present in bovine liver; and it has been claimed from before that eating raw liver carries a high risk of food poisoning. In 2011, some cases of enterohemorrhagic *Escherichia coli* (hereinafter, EHEC) present in the liver were reported, and a warning was issued by the Ministry of Health, Labour and Welfare against supplying liver for raw consumption (No. 1220 Item 1 issued by the Food Safety Commission (Dec. 20, 2011). While details of the origin of *Campylobacter* and EHEC present in bovine liver have not yet been elucidated, one possibility may be cross contamination from intestinal tract contents during slaughtering, and another possibility may be contamination caused by bile transferred from the intestinal tract to the liver via bile circulation through the liver, gallbladder, and intestinal tract. Furthermore, the possibility that bacteria might transfer into the liver by bacterial translocation from the intestinal tract via the portal vein is also considered. In fact, *Campylobacter* is known to exist in bovine bile.

With such background, disinfection of liver has been practiced to enhance its safety as an ingredient. A conventionally known method for disinfecting liver is mainly washing the surface with tap water, and methods that additionally perform surface sterilization by soaking the liver in functional water such as ozone water or ice water, a chlorine-based disinfectant, and such are known. The most widely used chlorine-based disinfectant is, for example, sodium hypochlorite. Industrially, sodium hypochlorite is produced by allowing a sodium hydroxide (NaOH) solution to absorb chlorine gas. Commercially available concentrated solutions of sodium hypochlorite are strongly alkaline solutions at pH12.5-13.5 which contain 5-12% free active chlorine. The major ingredients of the sodium hypochlorite solution are hypochlorous acid (HOCl) and NaOH. HOCl exists in the dissociated form (OCl$^-$) when the pH of the solution is alkaline, and as the solution becomes acidic, the ions are gradually protonated and become the non-dissociated form (HOCl). As the solution becomes more acidic, a portion of the HOCl changes to dissolved chlorine ($Cl_2$) (FIG. 10). While HOCl, OCl$^-$, and $Cl_2$ all have a sterilizing effect, $Cl_2$ quickly disappears through outgassing and is unstable; therefore, disinfection and sterilization are generally carried out in a pH range where HOCl and OCl$^-$ ion are predominant. OCl$^-$ does not pass through the cell wall or cell membrane, and exerts the sterilizing effect by causing damage through an oxidizing action from outside the cell membrane. On the other hand, HOCl passes through the cell wall of a microorganism and is considered to exert the sterilizing effect by oxidizing essential components such as nucleic acids and enzymes present in the cytoplasm and plasma membrane. Therefore, in general, HOCl is considered to have a stronger disinfecting power than OCl$^-$. Accordingly, to enhance the sterilizing effect, an electrolytic method which produces HOCl by electrolyzing a dilute saline solution and hydrochloric acid, a two-solution method that raises the abundance ratio of HOCl by mixing sodium hypochlorite with an acidic solution and diluting it in tap water, and such are used.

Chlorine-based disinfectants have been approved as a food additive, and are used in various areas such as for perishable food. However, it is known that as a disadvantage, the sterilizing effect is extremely reduced in cases where organic substances are mixed in. In fact, it has been reported that surface wash with a hypochlorous acid solution cannot necessarily be said to provide a sufficient sterilizing effect as bacteria are found even after the disinfection (Non-Patent Documents 1 and 2). Furthermore, since these methods only sterilize the surface of the liver, it has been impossible to eliminate bacteria in the blood vessels and bile ducts, and organic substances in the bile ducts. Furthermore, in the sterilization method that applies super high pressure as described in Patent Document 1, problems such as the cost of setting up a pressure device, and the possibility that the color and texture of the liver may change due to pressurization have been raised.

PRIOR ART DOCUMENTS

Patent Documents

[Patent Document 1] Japanese Patent Application Kokai Publication No. (JP-A) 2004-16189 (unexamined, published Japanese patent application)

Non-Patent Documents

[Non-Patent Document 1] Ministry of Health, Labour and Welfare; Milk, Meat, and Sea Food Group of the Food Hygiene Committee, 24 Feb. 2012, Meeting Material 4

[Non-Patent Document 2] Infectious Agents Surveillance Report Vol. 23, No. 6 (2002.6) (141-2).

SUMMARY OF THE INVENTION

Problems to be Solved by the Invention

The present invention was achieved in view of the circumstances described above. An objective of the present invention is to provide sterilization methods against microorganisms present in livers obtained from a non-human animal for raw consumption, and methods for producing sterilized liver for raw consumption. An objective of the present invention is also to provide sterilized liver.

Means for Solving the Problems

To achieve the above-described objectives, the present inventors performed suitable methods to disinfect cross contamination that occurs at cattle disassembling, and examined whether bacteria in the liver could be killed. Furthermore, the present inventors examined whether or not bacteria present inside the liver could be killed by disinfecting the inside of the bile duct and/or the inside of the portal vein by suitable disinfection methods, and further freezing the liver.

Specifically, the present inventors artificially adhered enterohemorrhagic *Escherichia coli* or *Campylobacter* to the surface of a liver, and examined the sterilizing effect of chlorine-based disinfectants. As a result, the present inventors discovered that bacteria present on the surface of the liver can be sterilized using a chlorine-based disinfectant.

Furthermore, the present inventors performed artificial contamination by infusing enterohemorrhagic *E. coli* or *Campylobacter* into the bile duct and the portal vein of the liver, and examined the cleaning effect of hot water and the sterilizing effect of chlorine-based disinfectants. As a result, the inventors found out that bacteria present in the liver including those inside the liver can be killed through sterilization by washing the bile duct and/or the portal vein of the liver with hot water, and then using a chlorine-based disinfectant to disinfect the bile duct and/or the portal vein and the surface of the liver. Furthermore, the present inventors discovered that disinfecting the liver with a chlorine-based disinfectant, and then freezing it can further enhance the sterilizing effect.

In addition, the present inventors examined the sterilizing effect of adding a disinfecting step to infiltrate the liver with a chlorine-based disinfectant after disinfecting the surface of the liver. As a result, the inventors discovered that the sterilizing effect can be remarkably enhanced.

Furthermore, the inventors discovered that microorganisms inside the liver and on its surface could be effectively reduced by thawing a frozen liver at an ice-water temperature.

The present invention is based on such findings and relates to the following:

[1] a method for producing a liver sterilized of a microorganism, which comprises the steps of:
(a) infusing hot water at a high pressure into either or both of the bile duct and the portal vein of a liver removed from a non-human animal; and
(b) infusing a chlorine-based disinfectant into either or both of the bile duct and the portal vein of the liver of step (a);

[2] the method of [1], further comprising the step of allowing a chlorine-based disinfectant to infiltrate into the liver;

[3] the method of [1] or [2], further comprising the step of freezing the liver;

[4] the method of [1], further comprising the steps of:
(a) disinfecting the surface of the liver using a chlorine-based disinfectant; and
(b) freezing the liver of step (a);

[5] the method of [4], further comprising, prior to the step of freezing the liver, the step of allowing a chlorine-based disinfectant to infiltrate into the liver;

[6] the method of any one of [3] to [5], further comprising the step of thawing the liver;

[7] the method of any one of [1] to [6], wherein the microorganism is a microorganism that causes food poisoning;

[9] the method of [7], wherein the microorganism that causes food poisoning is a microorganism selected from the group consisting of *Campylobacter*, pathogenic *Escherichia coli*, *Salmonella*, *Shigella*, *Aeromonas*, and *Staphylococcus*, and hepatitis E virus; and

[9] a sterilized liver tissue obtained by the method of any one of [1] to [8].

Effects of the Invention

The present invention provides sterilization methods against microorganisms in the liver, bile duct, or blood vessels. By these methods, it is possible to reduce the risk of food poisoning due to consumption of raw liver, which is caused by microorganisms such as *Campylobacter* and enterohemorrhagic *Escherichia coli*. In particular, the methods of the present invention are useful for preventing microbial contamination of the liver, which is caused by cross contamination from the intestinal tract contents, and occurs at cattle disassembling.

The present invention has established a technique that enables removal of food-poisoning microorganisms such as *Campylobacter* and pathogenic *E. coli* present in the bile duct and portal vein while keeping the liver in a state that can be eaten raw. The present invention can provide safe livers from which microorganisms have been removed not only from the surface but also from the inside of the livers.

With respect to sterilization with a chlorine-based disinfectant, the extreme reduction of the sterilizing effect due to organic substances attached to the liver was an issue. However, in the method of the present invention, microorganisms remaining in the liver after sterilization using a chlorine-based disinfectant can be subjected to further sterilization by freezing and thawing the liver.

BRIEF DESCRIPTION OF THE DRAWINGS

FIGS. 2A-2D present photographs showing the change in colony shape as a result of disinfection. A and C show the colony shape in the untreated group; and B and D show the colony shape in the chlorine-treated group (2,000 ppm).

Ten minutes later, chlorine was neutralized with sodium thiosulfate; then, 100 μL was inoculated into SMAC medium, and the number of colonies obtained was determined.

Figure 4:
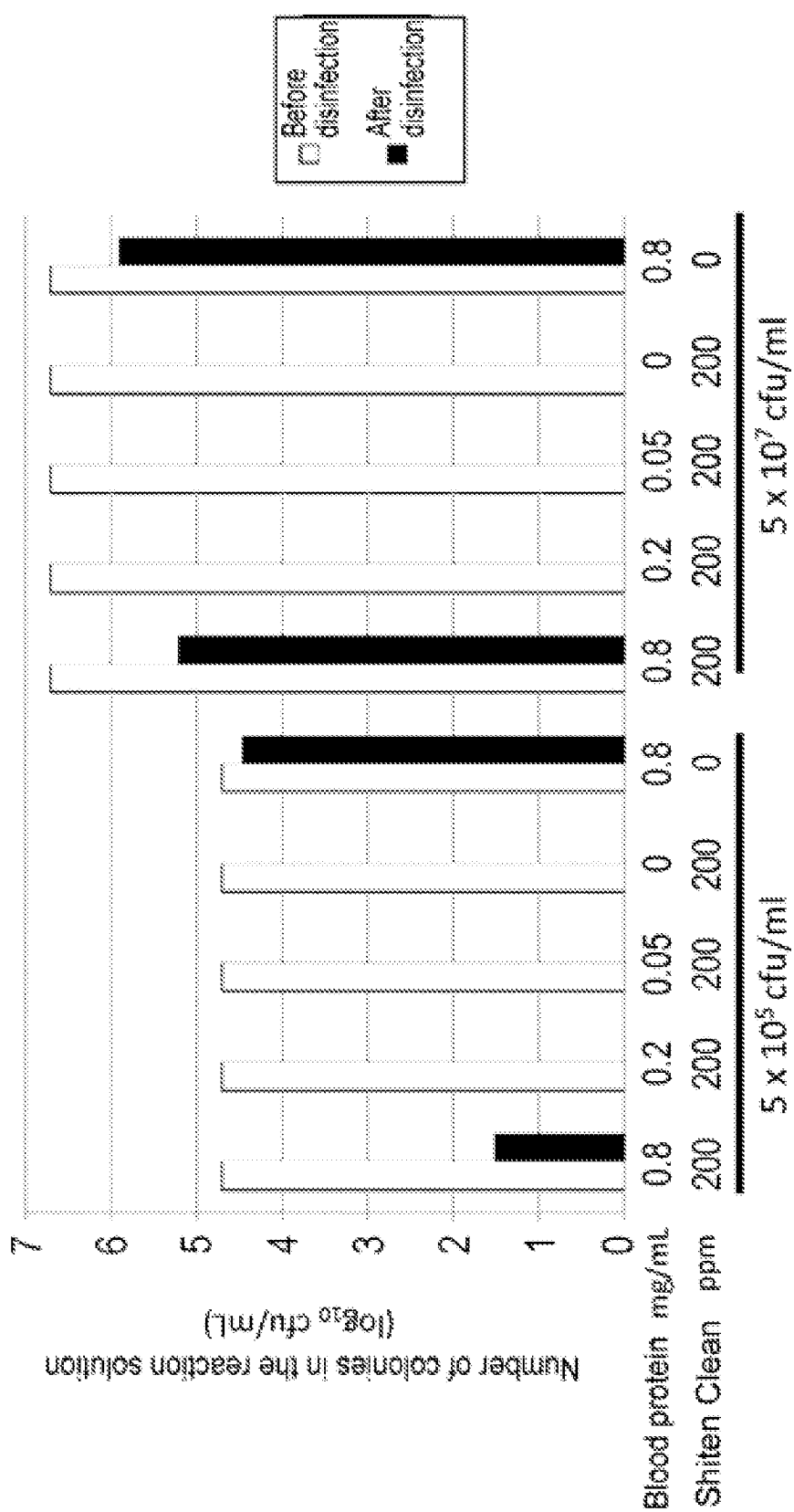

FIG. 4 is a graph showing the sterilizing effect of a chlorine-based disinfectant against *C. jejuni* in the presence of wash fluid from the blood vessel. A 400 ppm disinfectant solution and a bacterial suspension (approximately $5 \times 10^5$, $5 \times 10^7$ cfu/mL) were mixed at a ratio of 1:1. Ten minutes later, chlorine was neutralized with sodium thiosulfate; then, 100 μL was inoculated into mCCDA medium, and the number of colonies obtained was determined.

Figure 5:
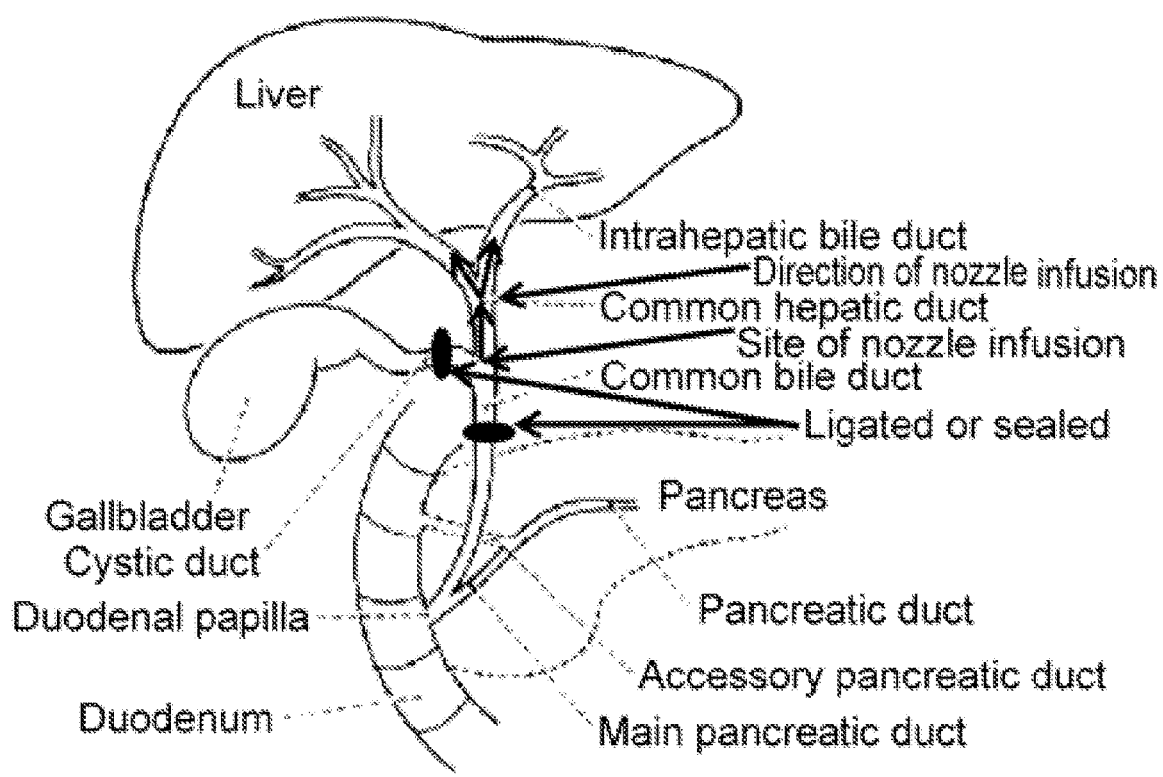

FIG. 5 is a diagram describing the structure of the biliary system, and infusion of hot water and a chlorine-based disinfectant into the bile duct and the portal vein.

Figure 6:
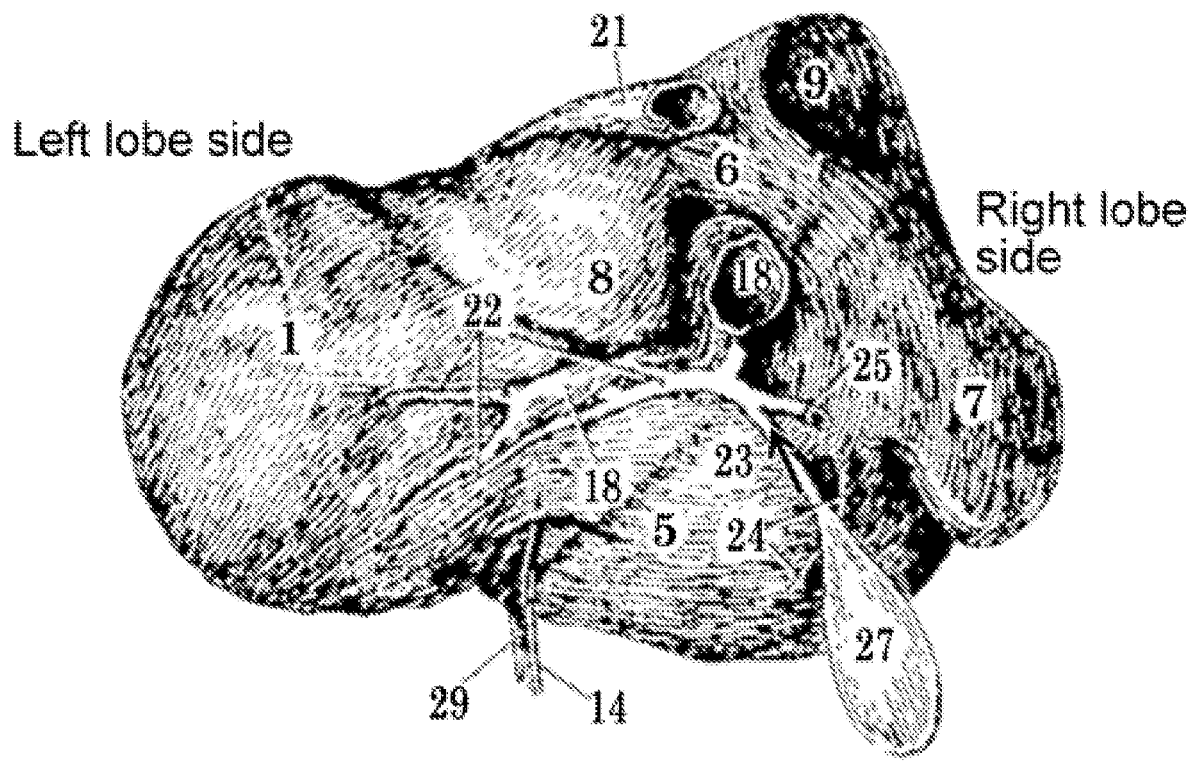

FIG. 6 depicts the structure of a bovine liver.

Figure 7:
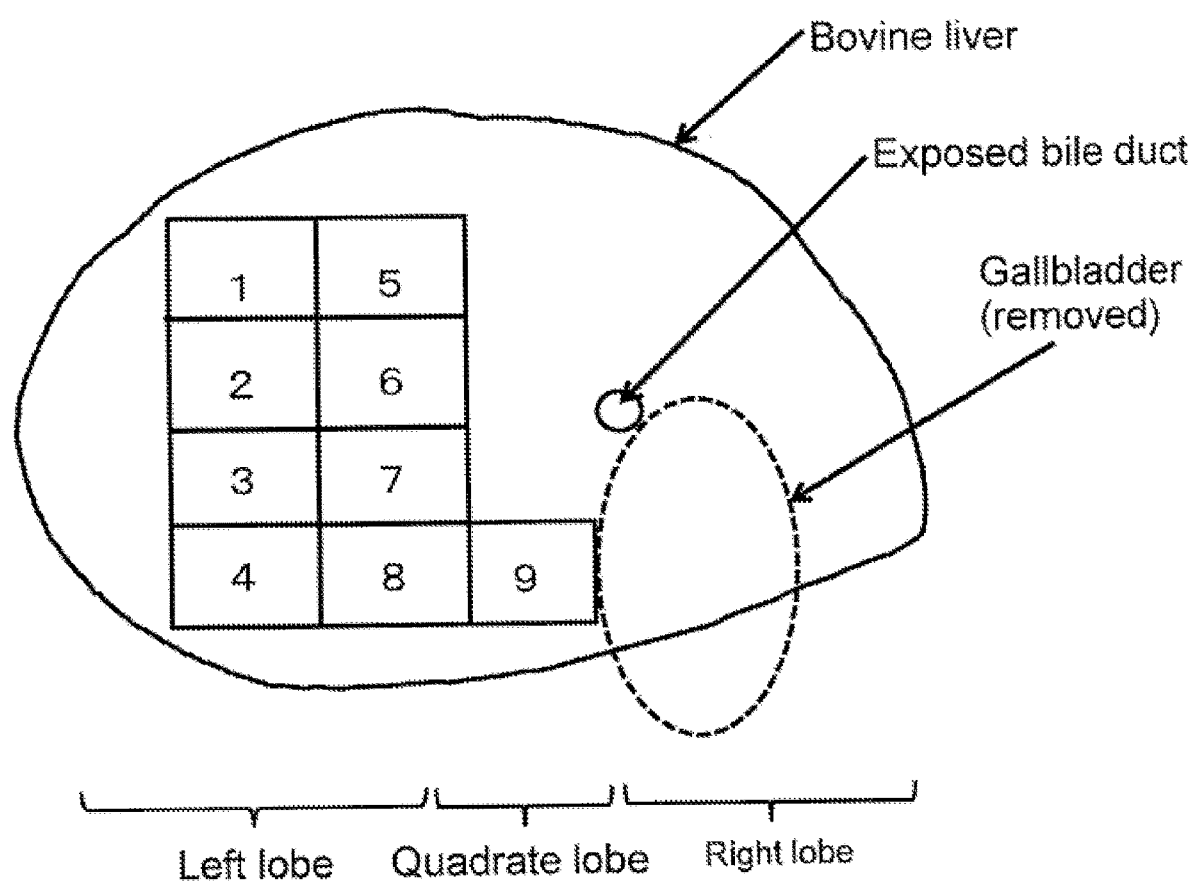

FIG. 7 shows the numbering for the respective blocks of the left lobe of the liver used in Example 6.

Figure 8:
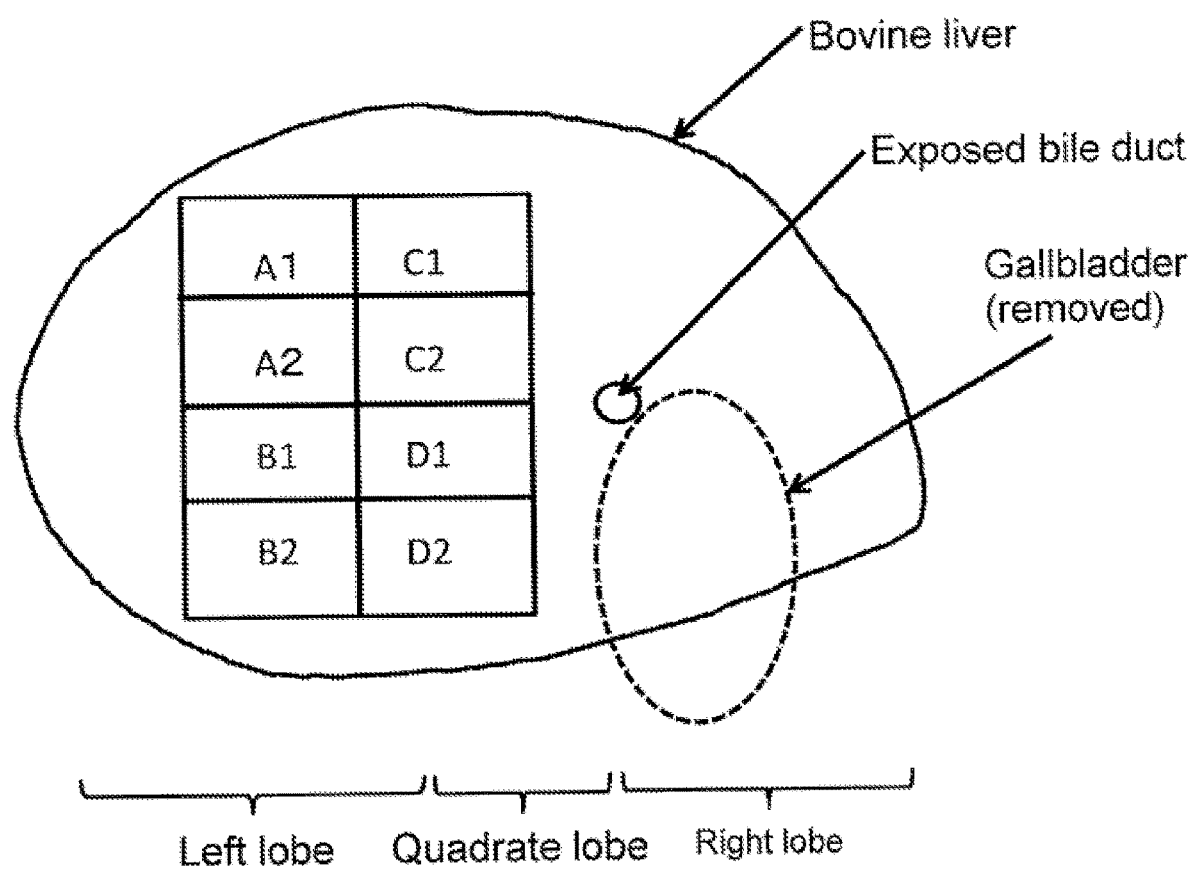

FIG. 8 shows the numbering for the respective blocks of the left lobe of the liver used in Example 7.

Figure 9:
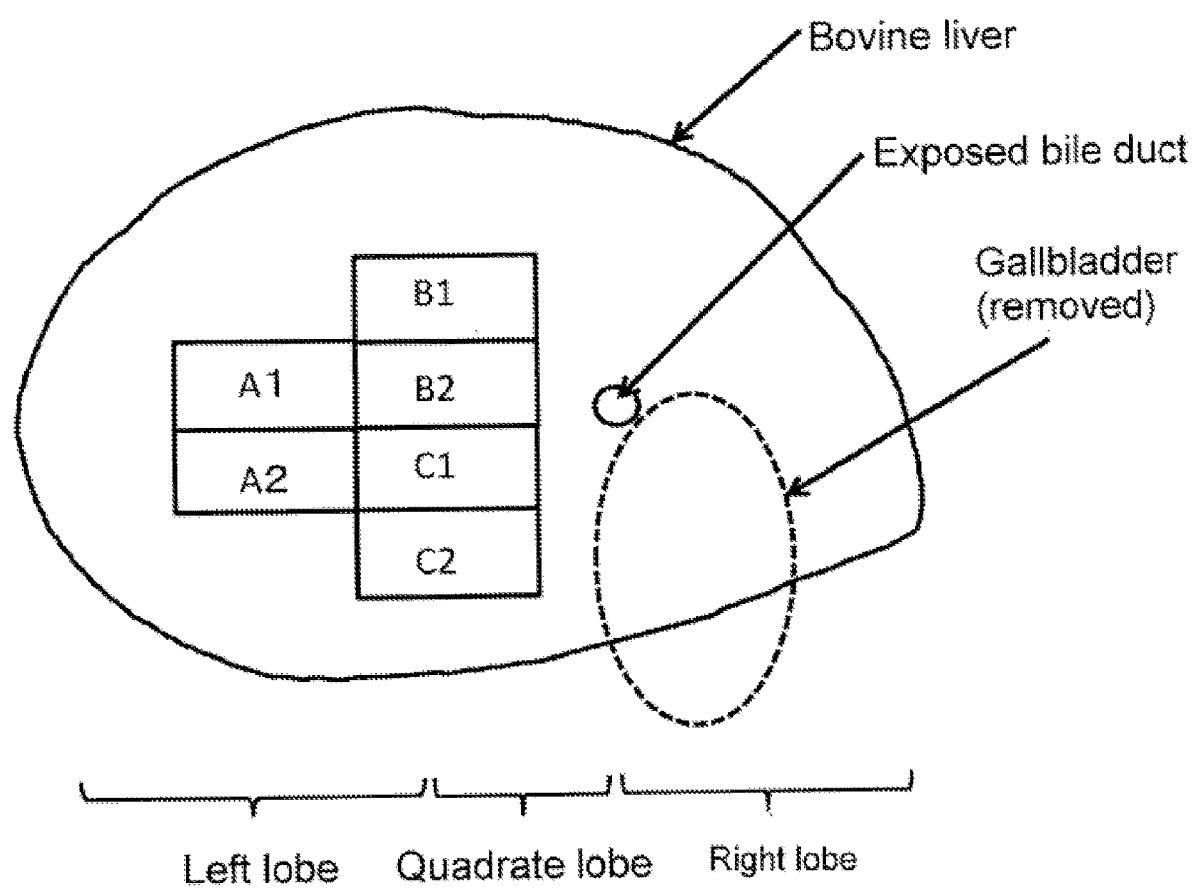

FIG. 9 shows the numbering for the respective blocks of the left lobe of the liver used in Examples 9 to 11.

Figure 10:
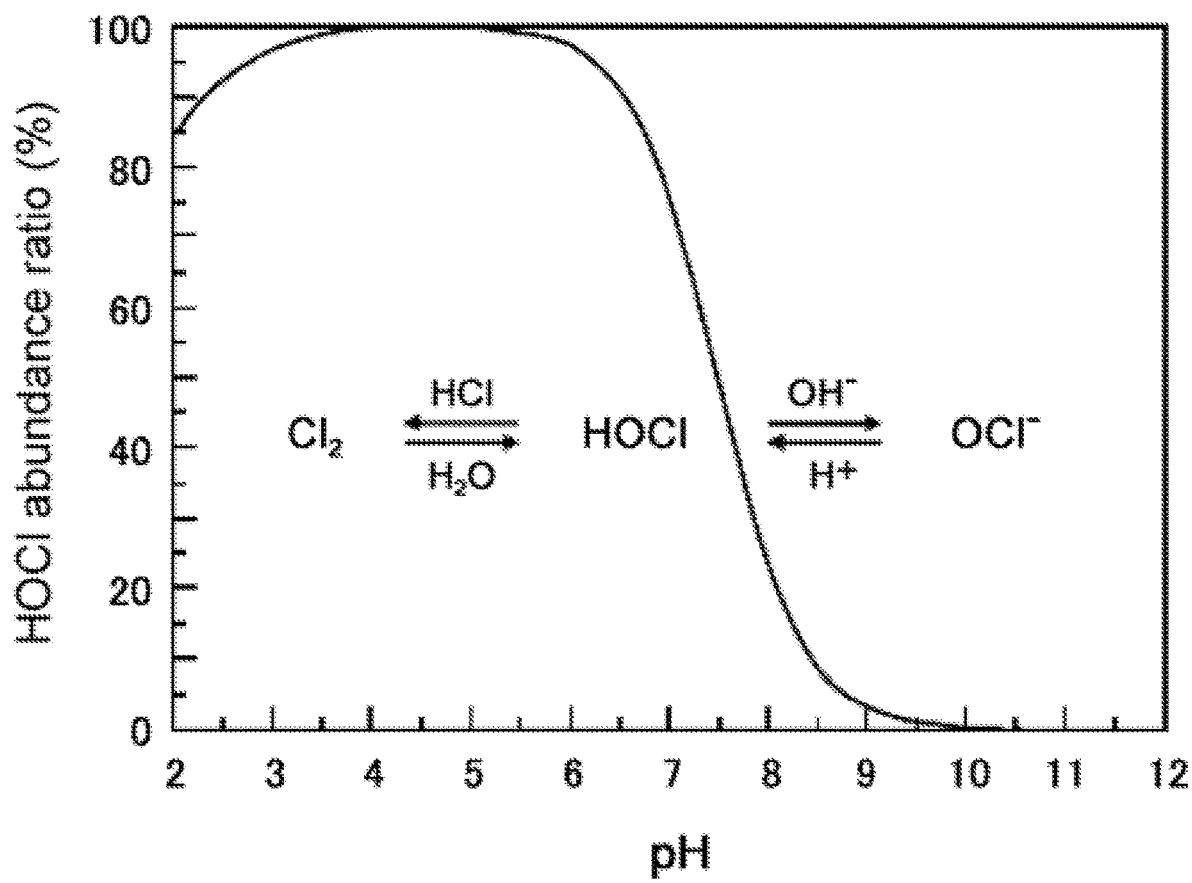

FIG. 10 shows the relationship between the chemical equilibrium of free active chlorine and pH.

FIG. 11 shows the disinfection effects by Eva water (Table 8).

FIG. 12 shows the disinfection effects by V-INAC (Table 9).

FIG. 13 shows the disinfections effects by Teruron Bleach (Table 10).

FIG. 14 shows the disinfections effects by combined use of V-INAC and Eva water (Table 11).

DETAILED DESCRIPTION

Mode for Carrying Out the Invention

The present invention relates to methods for producing a liver sterilized of microorganisms, which comprise the steps of:
(a) infusing hot water at high pressure into the bile duct and/or the portal vein of a liver removed from a non-human animal; and
(b) infusing a chlorine-based disinfectant into the bile duct and/or the portal vein of the liver of step (a).
The invention also relates to sterilization methods against microorganisms present in the liver.

Use of the methods of the present invention enables production of a liver with sterilized surface and/or interior. By the methods of the present invention, microorganisms present on the surface and/or interior of the liver can be killed. In the present invention, "sterilization" can also be expressed as "elimination of microorganisms".

In the present invention, microorganisms that are targets of the sterilization include bacteria, viruses, and protozoa. Therefore, "sterilization" in the present invention includes killing viruses and protozoa in addition to killing bacteria. The bacteria, viruses, and protozoa that become targets of sterilization in the present invention are not particularly limited, but examples include those that cause infection such as food poisoning. "Disinfection" is a method of treatment used to reduce the number of living microorganisms. In the present invention, the "sterilization" also includes "disinfection".

Bacteria that cause food poisoning include infectious bacteria and toxic bacteria. Without being limited thereto, examples of infectious bacteria include:

*Campylobacter* bacteria;
*Escherichia* bacteria (pathogenic *E. coli*);
*Salmonella* bacteria;
*Shigella* bacteria;
*Vibrio* bacteria;
*Aeromonas* bacteria;
*Pleisiomonas* bacteria;
*Yersinia* bacteria;
*Listeria* bacteria;
*Cronobacter* bacteria;
*Citrobacter* bacteria;
*Enterobacter* bacteria;
*Proteus* bacteria;
*Providencia* bacteria;
*Brucella* bacteria;
*Helicobacter* bacteria; and
*Serratia* bacteria.

Meanwhile, examples of toxic bacteria include:
*Staphylococcus* bacteria;
*Clostridium* bacteria; and
*Bacillus* bacteria;
but are not limited thereto.

Examples of viruses that cause food poisoning include:
norovirus;
rotavirus;
adenovirus;
astrovirus;
hepatitis A virus; and
hepatitis E virus;
but are not limited thereto.

Examples of protozoa that cause food poisoning include:
*Cryptosporidium*;
*Cyclospora*;
*Kudoa* (*Sarcosporidia*);
amebic dysentery; and
*Sarcocystis*;
but are not limited thereto.

*Campylobacter* bacteria are pathogenic bacteria that infect humans, as well as wild and domestic animals, and cause miscarriage and enteritis in animals and enteritis in humans. For humans, known *Campylobacter* infection-causing bacteria are *Campylobacter jejuni* and *Campylobacter coli*, and these are designated as food poisoning bacteria (JP-A (Kokai) S62-228096, and JP-A (Kokai) H02-84200).

*Campylobacter* is classified into 15 species and 9 sub-species. Among them, *C. jejuni* accounts for 95-99% of the species isolated from human diarrhea, and *C. coli* and other species represent several percent (JP-A (Kokai) 1402-154700). The carriage rate of *C. coli* in pigs is very high. In recent years, there is an increasing trend of *Campylobacter* infection along with increases in import meat mainly from Southeast Asia. In particular, there has been a rapid increase in cases of infection due to chicken meat-related food products, of which consumption as substitutes for beef has been growing because of problems such as BSE and O157.

In addition, *Campylobacter fetus* has been known to be a bacterium that causes miscarriage in sheep and cows, but in recent years, there have been reports that they are involved in miscarriage and premature birth in humans. Furthermore, *C. fetus* infection due to eating raw beef and liver contaminated with *C. fetus* may present symptoms such as sepsis and meningitis. The most important source of infection to humans is chicken meat, which carries the bacteria at high concentration in the intestinal tract (JP-A (Kokai) H03-112498).

On the other hand, while there are many types of harmless *E. coli*, there are pathogenic *E. coli* that are harmful to the human body. Examples of target pathogenic *E. coli* in the sterilization of the present invention include:

enterohemorrhagic *E. coli* (EHEC) (O26, O103, O111, O128, O145, O157, etc.);

enteropathogenic *E. coli* (EPEC) (O6, O44, O55, O86, O111, O114, O119, O125, O127, O128, O142, O158, etc.);

enteroinvasive *E. coli* (EIEC) (O28ac, O112, O121, O124, O136, O143, O144, O152, O164, etc.);

enterotoxic *E. coli* (ETEC) (O6, O8, O11, O15, O25, O27, O29, O63, O73, O78, O85, O114, O115, O128, O139, O148, O149, O159, O166, O169, etc.); and enteroaggregative (EAggEC) (O44, O104, O127, O128, etc.);

but are not limited thereto.

*Salmonella* bacteria are a type of enteric bacteria that mainly live in the digestive tract of humans and animals, and some of them show pathogenicity by infecting humans and animals. Among the *Salmonella* bacteria having pathogenicity for humans, those that are known to cause infectious food poisoning are *S. typhimurium* and *S. enteritidis*. They cause typical infectious food poisoning, and the main symptoms include digestive symptoms such as abdominal pain, vomiting, and diarrhea (or mucous and bloody stool in some cases), and fever (hyperthermia); and those without resistance may develop bacteremia, and the condition may become severe. In rare cases, this may be combined with sepsis due to endotoxins and may lead to death. While there are many cases of food poisoning caused by chicken eggs contaminated with *Salmonella* bacteria, eating raw liver or meat contaminated with intestinal tract contents during slaughtering, and secondary contamination by such contaminated food materials via cooking utensils become causes of food poisoning. Infection through pets is also known.

Hepatitis E is an acute viral hepatitis conventionally referred to as orally transmitted non-A, non-B hepatitis; and its pathogen is hepatitis E virus (HEV). The fatality rate of hepatitis E is said to be ten times that of hepatitis A, and the rate may in fact reach 20% in pregnant women. The virus is carried by animals such as pigs, deer, and wild boar; and recently it has been pointed out that the route of infection is consumption of raw slices of these animals or liver sashimi (slices of raw meat).

High-pressure infusion of hot water into the bile duct and the portal vein of a non-human animal can be carried out using, for example, a pressure-type spray gun. More specifically, a nozzle is inserted into the common bile duct on the side of the gall bladder, and infusion is carried out by ligating or sealing the end of the bile duct leading towards the intestinal tract with a plug or finger. The bile duct branches to the left lobe side and to the right lobe side at the entrance of the common bile duct into the liver, and therefore the nozzle is inserted all the way to the back of each branch, and the left lobe and the right lobe are thoroughly infused by changing the angle. When necessary, the nozzle is inserted into the bile duct leading to the intestinal tract, and after the common bile duct is sealed on the side of the gallbladder, infusion is carried out from the opposite direction as well (see FIG. 5 and FIG. 6). Infusion into the portal vein is carried out by inserting the nozzle from the excised and disengaged portal vein, fixing the nozzle and the portal vein with clamps, fingers, or such to avoid leaking, and then carrying out the infusion.

High-pressure infusion of hot water into the bile duct and portal vein enables sterilization and cleaning against microorganisms in the bile duct and blood vessels (portal vein) and organic substances in the bile duct. This operation is preferably carried out multiple times. "Multiple times" includes twice, three times, four times, five times, or such, but is not limited thereto. The temperature and the amount of hot water infused into the bile duct and the portal vein of a non-human animal is preferably in a range where the liver is not denatured by heat. Examples of such a temperature range include, 55° C. to 90° C., preferably 70° C. to 85° C., and more preferably 80° C. to 85° C., but are not limited thereto. Furthermore, the amount of hot water infused is for example, 100 mL to 300 mL, preferably 150 mL to 250 mL, and more preferably 100 mL to 200 mL, but is not limited thereto. Infusion of hot water can be carried out one time or divided into several times. The duration of each infusion may be, for example, 1 to 20 seconds, preferably 3 to 15 seconds, and more preferably 5 to 10 seconds, but is not limited thereto.

Hot water is preferably infused at high pressure. The preferred pressure is, for example, 0.05 MPa to 0.5 MPa, or 0.1 MPa to 0.4 MPa, and particularly preferably 0.2 MPa to 0.3 MPa, without being limited thereto.

After infusion of hot water at high pressure, the hot water is removed, and a chlorine-based disinfectant is infused into the bile duct and/or the portal vein. The chlorine-based disinfectant can also be infused, for example, by a pressure-type spray gun. The detailed method is as described above. The amount infused each time is for example, 100 to 2,000 mL, preferably 150 mL to 1,000 mL, and more preferably 200 mL to 500 mL, but is not limited thereto. Infusion of a chlorine-based disinfectant can be carried out one time or divided into several times. The duration of each infusion may be, for example, 1 to 20 seconds, preferably 3 to 15 seconds, and more preferably 5 to 10 seconds, but is not limited thereto. Non-human animals in the present invention include cattle, pig, chicken, duck, horse, goat, sheep, wild boar, deer, rabbit, dog, whale, and dolphin, but are not limited thereto. Liver in the present invention is preferably liver of a non-human animal in which the bile duct and/or the portal vein has not been cut off, but is not limited thereto.

The chlorine-based disinfectant used in the present invention is not particularly limited as long as it can reduce microorganisms present in liver. In the present invention, a chlorine-based disinfectant refers to an agent containing active chlorine that is effective for disinfection. Known chlorine-based disinfectants include disinfectants containing compounds that produce hypochlorous acid or hypochlorite ions when dissolved in water, such as sodium hypochlorite and calcium hypochlorite; disinfectants containing hypochlorous acid and hypochlorite ions through the use of electrolysis, such as strong acidic water, aqueous hypochlorous acid, and electrolytic hypochlorite water; aqueous chlorine dioxide; and stabilized chlorine complex formulations; and those skilled in the art can select an appropriate disinfectant based on its composition and properties. Examples of commercially available disinfectants containing hypochlorite ions and such include:

Shiten Clean (distributor: Shiten);

V-INAC (distributor: Lupinas, registered trademark);

Teruron Bleach (distributor: ADEKA CLEAN AID Co., Ltd., registered trademark);

Milton (distributor: Kyorin Pharmaceutical Co., Ltd., registered trademark);

Puriphan P (distributor: Kenei Pharmaceutical, registered trademark);

Texant (distributor: Nippon Chemiphar Co., Ltd., registered trademark);

Hyporite (distributor: Sanchemipha Co., Ltd., registered trademark);

Purelox (distributor: OYALOX Co. Ltd., registered trademark);
Yakulax D (distributor: Yakuhan Pharmaceutical Co., Ltd.);
Hi-Clo Soft water (production equipment distributor: OAK);
Cleverin (distributor: Taiko Pharmaceutical Co., Ltd., registered trademark);
Eva water (distributor: Evatec Co., Ltd., registered trademark); and
K Guard (distributor: Eight Knot, Inc.)
and they can be obtained easily. Alternatively, a chlorine-based disinfectant may be prepared, and this can be used. Chlorine-based disinfectants can be prepared by methods known to those skilled in the art using for example, sodium hypochlorite or calcium hypochlorite.

In the present invention, use of a food additive-type disinfectant is preferred. Furthermore, in the present invention, a chlorine-based disinfectant may be used in combination with another agent. Examples of the other agent include alcohol-based disinfectants (for example, ethanol), organic acids and salts thereof, inorganic acids and salts thereof, agents containing surfactants and such, electrolyzed acidic water, and ozone water, but are not limited thereto.

The chlorine-based disinfectant infused into the bile duct and the chlorine-based disinfectant infused into the portal vein may be the same or different.

Those skilled in the art can select a suitable concentration and amount of the chlorine-based disinfectant to be used depending on the type and amount of microorganism present in the liver, the size of the liver, and the animal species from which the liver to be sterilized originates. The concentration of the chlorine-based disinfectant is, for example, 50 to 2,000 ppm, 100 to 2,000 ppm, preferably 100 to 1,000 ppm, more preferably 100 to 500 ppm, 200 to 500 ppm, and particularly preferably 200 to 400 ppm, without being limited thereto. Furthermore, the quantity of each infusion is, for example, 50 to 2,000 mL, preferably 150 to 1,000 mL, and more preferably 200 to 500 mL, but is not particularly limited thereto. Furthermore, the infusion time may be, for example, 1 to 20 seconds, preferably 3 to 15 seconds, and more preferably 5 to 10 seconds, but is not limited thereto.

In the present invention, the liver is preferably washed after disinfection with a chlorine-based disinfectant. Washing can be performed using tap water. The surface can be washed with a sufficient amount of running water. When water is infused, the amount is, for example, 100 to 300 mL, preferably 150 to 250 mL, and more preferably 100 to 200 mL, but is not limited thereto. Washing can be carried out at once or in several steps. The duration of each infusion is for example, 1 to 20 seconds, preferably 3 to 15 seconds, and more preferably 5 to 10 seconds, but is not limited thereto.

In the present invention, if the number of microorganisms contained in the bile in the gallbladder or the liver is decreased as compared to before infusion of hot water and a chlorine-based disinfectant, one can determine that sterilization has taken place.

Methods for detecting *Campylobacter* bacteria and pathogenic *E. coli* are well known. For example, without being limited to the following methods, the number of microorganisms contained in the bile in the gallbladder and the liver can be measured by those skilled in the art using commercially available detection reagents for ELISA immunochromatography, and such, in addition to methods for quantifying the number of bacteria in the bile by culturing, PCR, real time PCR, or such. For methods by culturing, *Campylobacter* bacteria are detected using, for example, an mCCDA medium, a blood agar medium, or a Skirrow's medium; pathogenic *E. coli* are detected using, for example, an SMAC medium, a CT-SMAC medium, or an LB medium; and *Salmonella* bacteria are detected using, for example, a DHL agar medium, an MLCB agar medium, or an SS agar medium, without limitations thereto.

Those skilled in the art can refer to documents such as "Toda's New Bacteriology, Nanzando, ISBN978-4-525-16013-5" to select and carry out the most suitable detection method.

Alternatively, for pathogenic *E. coli*, whether sterilization took place can be determined using colony shape as an indicator. More specifically, in the present invention, even if the number of bacteria does not change by infusion of hot water and a chlorine-based disinfectant, but the shape of the colonies changes from a smooth shape to a rough shape, it can be determined that a sterilizing effect has been observed for *E. coli*.

The methods of the present invention can further include in addition to the above-described steps (a) and (b), the step of:
(c) freezing the liver.

In addition to the chlorine disinfection treatment, freezing treatment of the liver after being vacuum packaged can enhance the disinfecting and sterilizing effects against microorganisms damaged by the hot water treatment and chlorine-based disinfectant treatment.

Alternatively, the methods of the present invention can further include in addition to the above-described steps (a) and (b), the steps of:
(c) disinfecting the surface of the liver using a chlorine-based disinfectant; and
(d) freezing the liver of step (c).

Steps (c) and (d) are performed to ensure complete sterilization against microorganisms damaged by steps (a) and (b). Disinfection using a chlorine-based disinfectant can be carried out, for example, by spraying the above-described disinfectant using an atomizer. The chlorine-based disinfectant described above can be used at a concentration described above.

On the other hand, liver can be frozen at a temperature range of, for example, −196° C. to −1° C., preferably −80° C. to −5° C., particularly preferably −40° C. to −10° C., and more preferably −30° C. to −20° C., for a duration such as one hour to two months, preferably two hours to one week, and particularly preferably five hours to 72 hours. Freezing conditions may be, for example, −196° C. for 28 hours, but are not limited thereto. Furthermore, after freezing, it is preferred that the liver is gently thawed at, for example, −10° C. to 10° C., preferably −3° C. to 5° C., and particularly preferably at an iced-water temperature (for example, in the range of −1° C. to 1° C., or preferably at 0° C.); and is stored at −3° C. to 10° C., or preferably at an iced-water temperature (for example, in the range of −1° C. to 1° C., or particularly preferably at 0° C.). Thus, the present invention can include the step of thawing a frozen liver. Furthermore, the present invention may include a step of storing the thawed liver. Preferably, freezing and storage of liver is carried out after placing the liver in a sealed container such as a nylon bag, and then vacuum packaging it using a conventional vacuum packaging machine.

It is surprising that the sterilizing effect against *E. coli*, *Campylobacter*, and such microorganisms, which can be generally preserved by freezing, is enhanced by freezing and storage in ice water after heat treatment and chlorine treatment.

Extracted liver tissues of non-human animals, including livers, bile ducts, and portal veins of non-human animals, can be obtained through common distribution channels. In view of microbial contamination during distribution processes, it is preferable to have as clean liver tissues as possible. Furthermore, liver tissues are preferably treated by a method of this invention at the time of disassembling.

In the present invention, it is possible to additionally include a disinfection step of allowing a chlorine-based disinfectant to infiltrate into the liver after disinfecting the surface of the liver. In the additional disinfection step, a chlorine-based disinfectant can be allowed to infiltrate (soak) into the liver using, for example, a liquid- and moisture-absorbing material (a sheet having moisture- and liquid-absorbing properties) containing a chlorine-based disinfectant. This can prevent vaporization of the chlorine-based disinfectant. Alternatively, the chlorine-based disinfectant can be added directly to the surface of the liver.

The liquid- and moisture-absorbing material used includes dehydration sheets for foods (Dripkeeper (registered trademark, distributor: Japan Vilene Co., Ltd.), Pichit (registered trademark, distributor: Okamoto Industries, Inc.), Serakeeper (distributer: Shotech)), and such, but it is not particularly limited as long as it has similar properties. Alternatively, infiltration (soaking) can be performed in a vacuum packaging container.

In the present invention, the liver can be frozen after the additional disinfection step.

The disinfectant to be used in the additional disinfection step may be, for example, those described above. It may be the same or different from the disinfectant used to disinfect the bile duct and portal vein.

For the concentration of the chlorine-based disinfectant, 100 to 2,000 ppm, 200 to 2,000 ppm, 500 to 2,000 ppm, or 200 to 500 ppm may be employed, but it is not limited thereto. Furthermore, the amount of the infiltration solution per 50 g of the sample may be 1 to 50 mL, preferably 5 to 30 mL, and more preferably 8 to 20 mL, but it is not limited thereto.

Furthermore, the soaking time may be, for example, 10 to 60 seconds, preferably 20 to 50 seconds, and more preferably 30 to 40 seconds, but is not limited thereto.

Livers obtained from such methods are livers whose surface and/or interior are sterilized of microorganisms (in particular, microorganisms that cause food poisoning). Thus, the present invention provides liver tissues with sterilized surface and/or interior, which can be obtained by methods of the present invention. Liver tissues of the present invention are different from liver tissues containing microorganisms such as *Campylobacter* and pathogenic *E. coli*, and do not have the risk of causing food poisoning when eaten raw. Such liver tissues are preferably distributed in a sealed form. Furthermore, a vacuum pack containing liver tissues can be treated under ultrahigh-pressure conditions of 2000 to 4500 atm. Through such treatment, the sterilized state of the liver can be maintained without loss of food texture and flavor of the liver.

The liver tissues of the present invention can be distributed as, for example, cleansed whole livers, liver segments such as the left and right lobes, or blocks of liver excised from edible portions, in a form sealed or vacuum-packaged in a nylon bag and such. In that case, this can be distributed as a set together with edible meat besides liver.

Furthermore, the present invention provides methods for preserving a liver, which comprises the steps of
(a) obtaining a liver sterilized by a method described herein; and
(b) storing the liver of step (a) at an ice-water temperature.

The temperature range for storing livers may be, for example, 0 to 4° C., or preferably in the ice-water temperature range (for example, −1° C. to 1° C., and particularly preferably 0° C.), but is not limited thereto. The storage method of the present invention can be used to further decrease microorganisms that cause food poisoning, and reduce the risk of transmission of microorganisms. In addition, livers can be stored and distributed safely without loss of food texture and taste.

All prior art documents cited in the specification are incorporated herein by reference.

EXAMPLES

Herein below, the present invention will be specifically described with reference to the Examples, but it is not to be construed as being limited thereto.

Example 1

Liver Surface Decontamination Experiment

Measures for surface decontamination: under the assumption that there is cross contamination of intestinal contents during disassembly, the surface of a liver was artificially contaminated with a certain amount of enterohemorrhagic *E. coli* or *Campylobacter*, and the sterilizing effect of a chlorine-based disinfectant was examined.

Method
1. The enterohemorrhagic *E. coli* O157 Sakai strain (hereinafter EHEC O157) and *Campylobacter jejuni* 81-176 strain (hereinafter *C. jejuni* 81-176) in the logarithmic growth phase were individually placed in PBS at approximately $10^5$ cfu/mL and $10^6$ cfu/mL, respectively. After preparation, they were respectively cultured in their suitable media for colony count. EHEC O157 was obtained from the Research Institute for Microbial Diseases, Osaka University (Purchase Number: RIMD0509952); and *C. jejuni* 81-176 was obtained from American Type Culture Collection (ATCC) (Purchase Number: BAA-2151).
2. The surface of a bovine liver was cut into blocks of approximately 10 $cm^2$ using a scalpel or a knife sterilized by boiling and with alcohol.
3. 1 mL each of the liquid bacterial mixture was applied evenly.
4. After this was left undisturbed for 30 minutes, the water wash group was sprayed with 10 mL of water, and the disinfection group was sprayed with approximately 10 mL of a chlorine-based disinfectant Teruron Bleach (ADEKA CLEAN AID Co., Ltd.) (400 ppm, 800 ppm) using an atomizer; and then they were left undisturbed for 30 minutes.
5. A sterile cotton roll or such was used to wipe 100 $cm^2$ of the surface of each block back and forth twice at constant pressure, and it was suspended in PBS and then squeezed several times. One hundred μL each of undiluted, 10-fold diluted, and 100-fold diluted samples of the squeezed-out liquid was spread onto an SMAC medium and an mCCDA medium in triplicate, and they were cultured individually. The SMAC medium was incubated under aerobic conditions at 37° C. for one day, and the mCCDA medium was incubated under microaerobic conditions (5% $O_2$, 10% $CO_2$, 85% $N_2$) at 37° C. for two days. The resulting EHEC-like colonies and *C. jejuni*-like colonies were counted.
Results
In the groups to which $10^5$ cfu/mL of EHEC O157 or *C. jejuni* 81-176 was applied, the surface-contaminating bacteria were completely removed using 400 ppm of the chlorine-based disinfectant. Furthermore, in the $10^6$ cfu/mL EHEC O157-applied group, EHEC O157 was also removed to approximately 1/2000 using 400 ppm of the chlorine-based disinfectant, and to approximately 1/10000 by using 800 ppm of the disinfectant. Also in the $10^6$ cfu/mL *C. jejuni* 81-176-applied group, *C. jejuni* was removed to approximately 1/1000 using 400 ppm of the disinfectant, and completely by using 800 ppm of the disinfectant (FIGS. 1A-1D).

Example 2

Inner Liver Decontamination Experiment

Measures for internal decontamination: Artificial contamination was performed by infusing a certain amount of enterohemorrhagic *E. coli* or *Campylobacter* into the bile duct of a liver, and the cleansing effect of warm water and the sterilizing effect of a chlorine-based disinfectant were examined.

Method

1. After bile was collected aseptically, the inside of the bile duct of a bovine liver from which the gallbladder and pancreas had been removed was washed gently, and the temperature was maintained at approximately 40° C. The collected bile was inoculated into CT-SMAC medium and mCCDA medium, and the background viable cell count was determined. Furthermore, as necessary, the bacterial load was determined by real time PCR.
2. From the bile duct to the liver, 20 mL of $10^5$ cfu/mL EHEC O157 or $10^6$ cfu/mL *C. jejuni* 81-176 was injected into the bile duct.
3. After this was left undisturbed for 30 minutes, approximately 150 mL of warm water (approximately 85° C.) was infused at high pressure (0.2 MPa) into the bile duct for washing. This operation was repeated. Furthermore, approximately 50 mL of warm water (approximately 85° C.) was infused at high pressure (0.2 MPa) into the portal vein for washing. Then, approximately 200 mL or 500 mL of a chlorine-based disinfectant Shiten Clean (Shiten) (400 ppm and 2,000 ppm) was infused at high pressure (0.2 MPa) into the bile duct for disinfection. Furthermore, approximately 200 mL of Shiten Clean was infused at high pressure into the portal vein (0.2 MPa) for disinfection.
4. After disinfection, this was left undisturbed for 30 minutes, and then sprayed with 400 ppm Teruron Bleach and 80% ethanol to disinfect the surface of the liver.
5. A knife or scalpel disinfected with hot water and alcohol was used to excise blocks of approximately 10 cm³ from two sites in the left lobe. The face, reverse side, and cut area of the excised blocks were trimmed aseptically, and two portions weighing approximately 50 g (4 cm×4 cm×3 cm) were aseptically excised from the center of the block.
6. Of the excised samples each weighing approximately 50 g, one was used without freezing, and an equivalent amount of PBS was added. This was subjected to a 30-second Stomacher treatment, and an equivalent amount of squeezed-out liquid was prepared.
7. The other sample was frozen at −35° C., and stored for 28 hours. Then, the sample was thawed gently at 4° C., and stored at 4° C. for 16 hours. Then, a squeezed-out liquid was prepared by the same method as described above.
8. The CT-SMAC medium and mCCDA medium was each inoculated with 100 μL of the squeezed-out liquid. The CT-SMAC medium was incubated under aerobic conditions at 37° C. for one day, and the mCCDA medium was incubated under microaerobic conditions (5% $O_2$, 10% $CO_2$, 85% $N_2$) at 42° C. for two days. The resulting EHEC-like colonies and *C. jejuni*-like colonies were counted.

On rare occasions, bacteria that proliferate in the CT-SMAC medium are present in the liver, and this may affect the experiment that uses EHEC O157. Therefore, bile was aseptically collected in advance, and the bile was inoculated into CT-SMAC medium. Liver that was found to have $10^6$ cfu/mL or more of *E. coli*-like colonies was discarded from the experiment that uses EHEC O157. For the experiment that uses *C. jejuni* 81-176, $10^6$ cfu/mL or so of *Campylobacter* bacteria may be present in the liver. However, in this Example, such was not discarded since there is unlikely a significant effect on the administered amount of *C. jejuni* 81-176 bacteria ($10^6$ cfu/mL).

Results

While there were individual differences in the non-disinfected group, an average of 46.7 to 111.8 cfu of EHEC O157 was present in the liver. Furthermore, even when disinfection was carried out using a chlorine-based disinfectant, no large difference was observed between the disinfected and non-disinfected groups in terms of the number of bacteria; and 12.3 to 570.0 cfu of EHEC O157 was detected. However, when the colony shape was compared between the disinfected and non-disinfected groups, EHEC O157 showed a typical smooth colony shape in the non-disinfected group, whereas in the chlorine-based disinfectant-treated group, a rough colony shape with rough surface was observed (FIG. 2).

When the damage to EHEC O157 as a result of freezing after disinfection was examined, the number of bacteria was reduced to 1/48 to 1/28 due to freezing in the non-disinfected group, but did not completely reach 0 cfu. On the other hand, in the chlorine-disinfected group, the number of bacteria became completely 0 in all groups, and the level of decrease showed a higher value than that in the non-disinfected group.

In the administration experiment using *C. jejuni* 81-176, complete disinfection to 0 cfu was not observed with the use of a chlorine-based disinfectant and freezing, but the level of decrease in the number of colonies (without freezing/after freezing) was approximately 7 to 66 in the group subjected to chlorine-based disinfection, compared to approximately 9 to 18 in the non-disinfected group; and an equivalent or greater bacteria-reducing effect was observed.

TABLE 1

Sterilization against EHEC in liver with a chlorine-based disinfectant and freezing.

| Disinfection | Post-disinfection treatment | Average number of colonies | Level of decrease in the number of colonies (without freezing/after freezing) |
|---|---|---|---|
| None | None | 46.67 | 28.00 |
|  | Freezing | 1.67 |  |
| None | None | 111.83 | 47.93 |
|  | Freezing | 2.33 |  |
| 400 ppm 200 mL | None | 12.33 | >12 |
|  | Freezing | 0.00 |  |
| 400 ppm 200 mL | None | 570.00 | >570 |
|  | Freezing | 0.00 |  |
| 2000 ppm 200 mL | None | 36.00 | >36 |
|  | Freezing | 0.00 |  |
| 2000 ppm 200 mL | None | 45.17 | >45.2 |
|  | Freezing | 0.00 |  |
| 2000 ppm 500 mL | None | 318.33 | >318 |
|  | Freezing | 0.00 |  |
| 2000 ppm 500 mL | None | 190.17 | >190 |
|  | Freezing | 0.00 |  |

TABLE 1-continued

Sterilization against EHEC in liver with a chlorine-based disinfectant and freezing.

| Disinfection | Post-disinfection treatment | Average number of colonies | Level of decrease in the number of colonies (without freezing/ after freezing) |
|---|---|---|---|
| 2000 ppm 500 mL | None Freezing | 73.83 0.00 | >73.8 |

TABLE 2

Sterilization against C. jejuni in liver with a chlorine-based disinfectant and freezing.

| Disinfection | Post-disinfection treatment | Average number of colonies | Level of decrease in the number of colonies (without freezing/ after freezing) |
|---|---|---|---|
| None | None | 3.17 | 9.50 |
|  | Freezing | 0.33 |  |
| None | None | 135.00 | 9.10 |
|  | Freezing | 14.83 |  |
| None | None | 1148.33 | 17.53 |
|  | Freezing | 65.50 |  |
| 400 ppm 200 mL | None Freezing | 575.00 45.33 | 12.68 |
| 400 ppm 200 mL | None Freezing | 18.50 1.83 | 10.09 |
| 400 ppm 200 mL | None Freezing | 1880.83 28.33 | 66.38 |
| 2000 ppm 200 mL | None Freezing | 151.33 21.83 | 6.93 |
| 2000 ppm 200 mL | None Freezing | 128.83 8.33 | 15.46 |
| 2000 ppm 200 mL | None Freezing | 104.17 7.67 | 13.59 |
| 2000 ppm 500 mL | None Freezing | 690.67 27.50 | 25.12 |
| 2000 ppm 500 mL | None Freezing | 676.67 47.17 | 14.35 |
| 2000 ppm 500 mL | None Freezing | 215.00 18.50 | 11.62 |

Example 3

Examination of the Flavor and Such

Fresh raw beef livers without treatment (the surface was washed with tap water followed by refrigeration at 4° C.) and treated according to the Examples (by washing the liver twice with 150 mL of hot water at 85° C., infusing 200 mL of 200 ppm Shiten Clean, disinfecting the surface with 400 ppm Teruron Bleach, cutting the liver into blocks, vacuum packaging it at a vacuum of approximately −0.07 to −0.09 MPa using a vacuum packaging device, and then freezing it at −35° C. and slowly thawing it at 4° C.) were given to 11 individuals (ten male participants and one female participant) for tasting. They evaluated the color, food texture (whether it has elasticity), tastiness, and smell (such as chlorine smell), and scored the treated raw liver using the following five-level evaluation system.

| [Evaluation] | [Points] |
|---|---|
| Good. Nearly unchanged. Cannot tell the difference. | 5 points |
| Somewhat good. Slightly different but not enough to be concerned. | 4 points |
| Normal. Some difference but not a problem for eating. | 3 points |
| Somewhat inferior. Clearly different, and cannot be ignored. | 2 points |
| Inferior. Clearly different. Hesitate to eat. | 1 point |

Results

All eleven participants did not observe negative effects on qualities such as form, smell, taste, food texture, and such; and determined that it has a high commercial value (Table 3). Furthermore, feedback from tasting the treated raw liver includes improvement of taste, flavor and food texture in the treated liver, such as absence of typical liver smell, easy to eat, ripe, tasty, sweet, even better than untreated liver, absence of peculiarity, and chewy.

TABLE 3

| Name (initials) | Gender | Color | Food texture | Tastiness | Smell |
|---|---|---|---|---|---|
| M. Y. | Male | 4 | 5 | 5 | 5 |
| Y. S. | Male | 5 | 4 | 5 | 5 |
| K. Y. | Male | 5 | 5 | 5 | 5 |
| I. M. | Male | 5 | 5 | 5 | 5 |
| K. N. | Male | 5 | 5 | 5 | 5 |
| Y. A. | Male | 5 | 5 | 5 | 5 |
| Y. F. | Male | 5 | 5 | 4 | 5 |
| K. O. | Male | 5 | 4 | 4 | 5 |
| T. T. | Male | 5 | 5 | 5 | 5 |
| E. O. | Male | 5 | 5 | 5 | 5 |
| A. O. | Female | 4 | 4 | 5 | 5 |

Example 4

Effects of a Chlorine-Based Disinfectant in the Presence of Organic Substances

Method 200 ppm of Shiten Clean and a portal vein wash fluid (mainly containing blood) were mixed at a 1:1 ratio, and allowed to react for ten minutes at room temperature. Then, chlorine was neutralized with a ten-fold amount of sodium thiosulfate, and then 100 μL of this fluid was inoculated into SMAC medium for EHEC O157 and mCCDA medium for C. jejuni 81-176; and the number of colonies obtained were calculated.

Results

Effects of the chlorine-based disinfectant were weakened for both EHEC O157 and C. jejuni 81-176 in the presence of a high concentration (0.8 mg/mL) of portal vein wash fluid (blood protein)

Figure 1A:
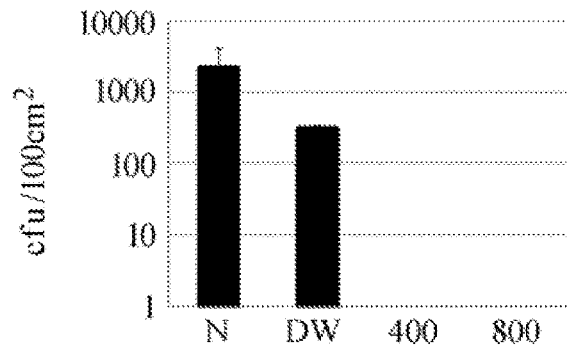
FIGS. 1A-1D show the effect of eliminating bacteria from surfaces contaminated with EHEC and *C. jejuni*. A: application of EHEC at $10^5$ cfu; B: application of *C. jejuni* at $10^5$ cfu; C: application of EHEC at $10^6$ cfu; D: application of *C. jejuni* at $10^6$ cfu; N: no treatment; DW: washing with DW; 400: treatment with 400 ppm disinfectant; 800: treatment with 800 ppm disinfectant.
Figure 1B:
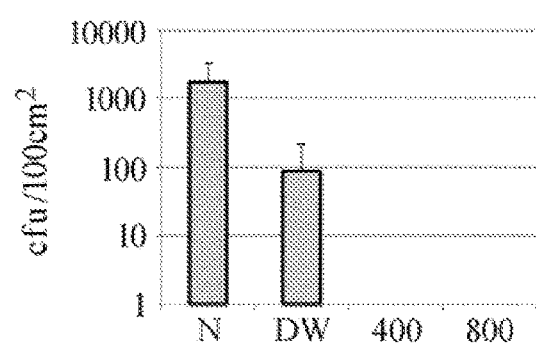
Figure 1C:
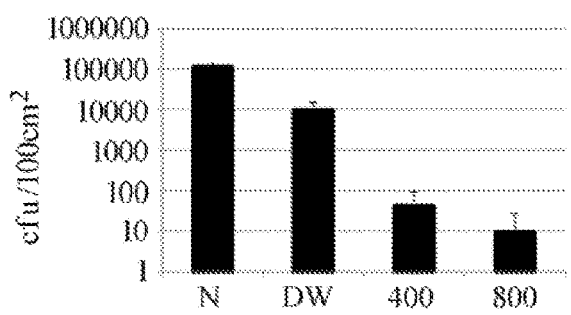
Figure 1D:
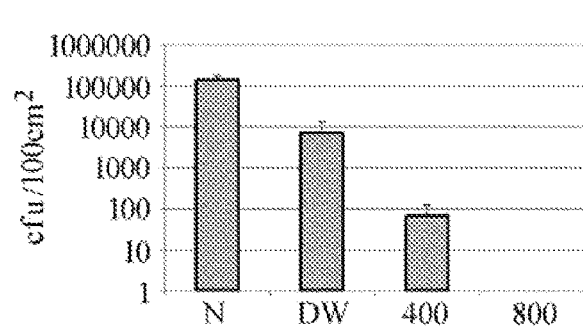
Figure 3:
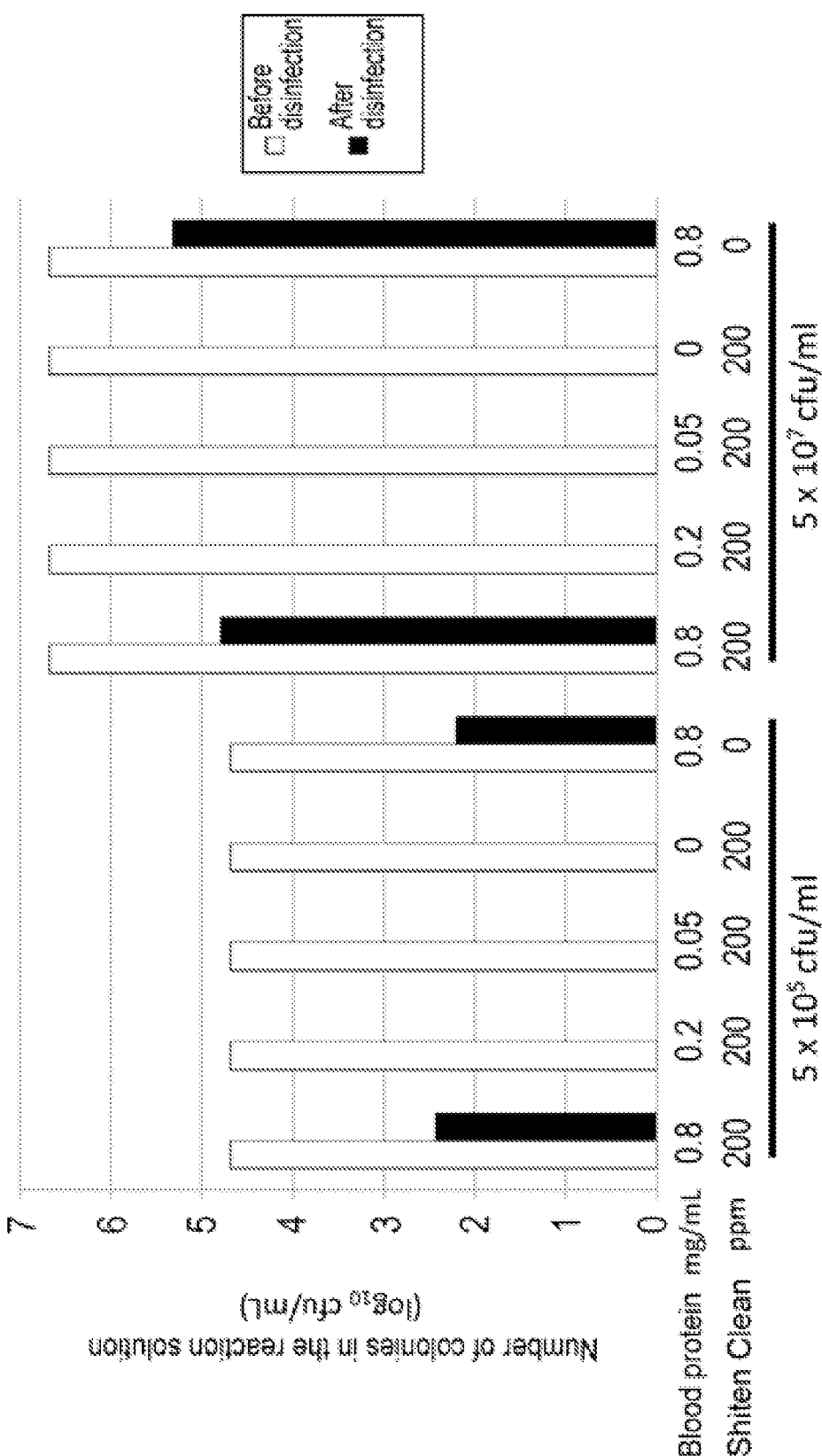
FIG. 3 is a graph showing the sterilizing effect of a chlorine-based disinfectant against EHEC O157 in the presence of wash fluid from the blood vessel. A 400 ppm disinfectant solution and a bacterial suspension (approximately $5\times10^5$, $5\times10^7$ cfu/mL) were mixed at a ratio of 1:1.

On the other hand, when a portal vein wash fluid diluted to ¼ (blood protein level of 0.2 mg/mL) was used, a disinfecting effect was observed, and approximately 5×10$^6$ cfu of EHEC O157 and C. jejuni 81-176 decreased to the detection limit of 0 cfu (100 cfu/ml or less) (FIGS. 3 and 4).

Example 5

Reduction Rate of Bacteria when Stored in Ice Water

Method

After bile was collected aseptically, the inside of the bile duct of a bovine liver from which the gallbladder and pancreas had been removed was washed gently, and the temperature was maintained at approximately 40° C. The collected bile was inoculated into CT-SMAC medium and mCCDA medium, and the background viable cell counts were determined. Furthermore, as necessary, the bacterial load was determined by real time PCR. Next, 20 mL of $10^5$ cfu/mL EHEC O157 and $10^6$ cfu/mL *C. jejuni* 81-176 were infused from the bile duct into the liver. After this was left undisturbed for 30 minutes, approximately 150 mL of warm water (approximately 85° C.) was infused at high pressure (0.2 MPa) into the bile duct for washing. This operation was repeated. Furthermore, approximately 50 mL of warm water (approximately 85° C.) was infused at high pressure (0.2 MPa) into the portal vein for washing.

Then, approximately 200 mL of Shiten Clean (400 ppm, 200 ppm, or 100 ppm) was infused at high pressure (0.2 MPa) into the bile duct for disinfection. Furthermore, approximately 200 mL of Shiten Clean (400 ppm, 200 ppm, or 100 ppm) was infused at high pressure into the portal vein (0.2 MPa) for disinfection. After disinfection, this was left undisturbed for 30 minutes, and then the surface of the liver was disinfected by spraying 400 ppm Teruron Bleach and 80% ethanol. A knife or scalpel disinfected using hot water and alcohol was used to cut out blocks of approximately 10 $cm^3$ from two sites in the left lobe. The face, reverse side, and the cut area of the excised blocks were trimmed aseptically, and three portions weighing approximately 50 g (4 cm×4 cm×3 cm) were aseptically cut out from the center of the block. One of the three excised samples was not subjected to freezing, and an equivalent amount of PBS was added, followed by a 30-second Stomacher treatment; and an equivalent amount of squeezed-out liquid was prepared. Among the other two samples, one of them was frozen at −35° C. and stored for 28 hours. Then, the sample was thawed gently at 4° C., and stored at 4° C. for 16 hours. The other sample was frozen, thawed, and then stored in ice water for 40 hours. After storage of these samples, a squeezed-out liquid was prepared by the same method as described above. The squeezed-out liquids were each inoculated at 100 μL into CT-SMAC medium and mCCDA medium. The CT-SMAC medium was incubated under aerobic conditions at 37° C. for one day, and the mCCDA medium was incubated under microaerobic conditions (5% $O_2$, 10% $CO_2$, 85% $N_2$) at 42° C. for two days. The obtained EHEC-like colonies and *C. jejuni*-like colonies were counted to examine the cleansing effect of warm water and the sterilizing effect of the chlorine-based disinfectant on internal contamination.

Livers found to possibly affect the experiment were discarded by the same method in Example 2.

Results

The degree of decrease in the number of colonies and the average number of colonies of EHEC O157 in the liver subjected to each of the treatments are shown in Table 4 (no freezing/4° C., no freezing/in ice water). While there were individual differences in the non-disinfected group, an average of approximately 80 cfu to approximately 150 cfu of EHEC O157 was present in the liver. The number of bacteria detected upon disinfection using a chlorine-based disinfectant was not very different from that of the non-disinfected group, and approximately 44 cfu to 805 cfu of EHEC O157 was detected.

After disinfection, the damage to EHEC O157 as a result of freezing was examined. In the non-disinfected group, decrease in the number of bacteria in the group stored at 4° C. was approximately 1/12 to 1/16. In the ice-water storage group, decrease in the number of bacteria was 1/30 to 1/180 when compared to the untreated group. On the other hand, in the group treated with 200 mL of 100 ppm chlorine disinfectant, large difference was not observed in the reduction rate of the number of bacteria due to freezing (stored at 4° C. and stored in ice water) when compared to the untreated group. However, in the groups treated at 200 ppm and 400 ppm, decrease in the number of bacteria due to freezing was observed when compared to the untreated group, and the reduction rate in the 4° C. storage group was 57 to 1000 or more. Furthermore, storage in ice water increased the reduction rate in nearly all groups except for some; and in some groups, the bacterial count was found to reach 0 even at chlorine concentrations as low as 100 ppm and 200 ppm.

TABLE 4

Sterilization against EHEC in the liver by a chlorine-based disinfectant and storage by freezing and in ice water

| Disinfection | Storage treatment | Average | SD | Reduction rate |
|---|---|---|---|---|
| None | None | 80.00 | 47.33 | 1.00 |
|  | 4° C. | 4.83 | 1.94 | 16.55 |
|  | In ice water | 2.67 | 1.37 | 30.00 |
| None | None | 150.50 | 163.89 | 1.00 |
|  | 4° C. | 12.17 | 11.51 | 12.37 |
|  | In ice water | 0.83 | 1.33 | 180.60 |
| None | None | 107.67 | 29.56 | 1.00 |
|  | 4° C. | 7.33 | 6.62 | 14.68 |
|  | In ice water | 0.67 | 0.82 | 161.50 |
| 400 ppm, 200 mL | None | 754.17 | 581.34 | 1.00 |
|  | 4° C. | 0.00 | 0.00 | >754 |
|  | In ice water | 0.33 | 0.52 | 2262.50 |
| 400 ppm, 200 mL | None | 215.17 | 90.40 | 1.00 |
|  | 4° C. | 3.00 | 3.35 | 71.72 |
|  | In ice water | 0.33 | 0.52 | 645.50 |
| 200 ppm, 200 mL | None | 57.33 | 17.11 | 1.00 |
|  | 4° C. | 1.00 | 0.63 | 57.33 |
|  | In ice water | 0.00 | 0.00 | >57.3 |
| 200 ppm, 200 mL | None | 194.17 | 26.44 | 1.00 |
|  | 4° C. | 0.17 | 0.41 | 1165.00 |
|  | In ice water | 0.00 | 0.00 | >194 |
| 200 ppm, 200 mL | None | 273.33 | 162.99 | 1.00 |
|  | 4° C. | 1.67 | 0.82 | 164.00 |
|  | In ice water | 1.00 | 0.63 | 273.33 |
| 100 ppm, 200 mL | None | 44.33 | 20.44 | 1.00 |
|  | 4° C. | 3.17 | 3.87 | 14.00 |
|  | In ice water | 0.00 | 0.00 | >44.3 |
| 100 ppm, 200 mL | None | >300 | ND | 1.00 |
|  | 4° C. | 20.00 | 16.97 | >15 |
|  | In ice water | 10.83 | 7.25 | >27.6 |
| 100 ppm, 200 mL | None | 805.00 | 523.63 | 1.00 |
|  | 4° C. | 0.50 | 0.84 | 1610.00 |
|  | In ice water | 7.83 | 9.89 | 102.77 |

Table 5 shows the average number of colonies and the degree of reduction in the number of colonies of *C. jejuni* in the liver subjected to each of the treatments (without freezing/at 4° C., without freezing/in ice water). While large difference in the degree of reduction in the number of colonies of *C. jejuni* 81-176 was not observed between the non-disinfected group and the group subjected to chlorine-based disinfection, storage in ice water showed a higher reduction rate than storage at 4° C. in nearly all groups.

TABLE 5

Sterilization against *C. jejuni* in the liver by a chlorine-based disinfectant and storage by freezing or in ice water

| Disinfection | Storage treatment | Average | SD | Reduction rate |
|---|---|---|---|---|
| None | None | 104.83 | 51.25 | 1.00 |
|  | 4° C. | 13.33 | 11.89 | 7.86 |
|  | In ice water | 11.00 | 2.83 | 9.53 |
| None | None | 430.17 | 479.74 | 1.00 |
|  | 4° C. | 40.00 | 32.50 | 10.75 |
|  | In ice water | 30.33 | 27.33 | 14.18 |
| None | None | 301.83 | 33.46 | 1.00 |
|  | 4° C. | 6.00 | 1.41 | 50.31 |
|  | In ice water | 1.50 | 1.05 | 201.22 |
| 400 ppm, 200 mL | None | 10.50 | 2.95 | 1.00 |
|  | 4° C. | 2.83 | 2.14 | 3.71 |
|  | In ice water | 2.17 | 1.72 | 4.85 |
| 400 ppm, 200 mL | None | 222.17 | 202.67 | 1.00 |
|  | 4° C. | 0.00 | 0.00 | >222 |
|  | In ice water | 20.17 | 20.67 | 11.02 |
| 400 ppm, 200 mL | None | 99.33 | 22.03 | 1.00 |
|  | 4° C. | 17.17 | 21.99 | 5.79 |
|  | In ice water | 20.17 | 15.47 | 4.93 |
| 200 ppm, 200 mL | None | 31.33 | 13.95 | 1.00 |
|  | 4° C. | 4.33 | 3.56 | 7.23 |
|  | In ice water | 1.83 | 0.75 | 17.09 |
| 200 ppm, 200 mL | None | 88.83 | 15.72 | 1.00 |
|  | 4° C. | 28.50 | 17.75 | 3.12 |
|  | In ice water | 9.80 | 3.70 | 9.06 |
| 200 ppm, 200 mL | None | 154.67 | 91.27 | 1.00 |
|  | 4° C. | 14.33 | 6.62 | 10.79 |
|  | In ice water | 9.67 | 4.32 | 16.00 |
| 100 ppm, 200 mL | None | 29.33 | 14.43 | 1.00 |
|  | 4° C. | 3.67 | 2.94 | 8.00 |
|  | In ice water | 2.00 | 2.53 | 14.67 |
| 100 ppm, 200 mL | None | 3.17 | 1.83 | 1.00 |
|  | 4° C. | 0.17 | 0.41 | 19.00 |
|  | In ice water | 0.00 | 0.00 | >3.1 |
| 100 ppm, 200 mL | None | 358.00 | 220.62 | 1.00 |
|  | 4° C. | 4.17 | 4.36 | 85.92 |
|  | In ice water | 3.67 | 2.34 | 97.64 |

Example 6

Confirmation of Variability and Evenness of Internal Contamination by Artificially Injected Bacteria For accurate measurement of disinfecting effects, bacteria were artificially injected into liver, and distribution of the bacteria in each region was confirmed.

Method

Twenty mL of $3\times10^6$ cfu/mL EHEC O157 was infused from a bile duct into the liver. Subsequently, the surface of the liver was disinfected by spraying 400 ppm Teruron Bleach and 80% ethanol. Next, a knife or scalpel disinfected with hot water and alcohol was used to cut out blocks of approximately 100 cm³ from nine sites in the left lobe and the lower quadrate lobe of the liver as shown in FIG. 7. The face, reverse side, and cut area of the excised blocks were trimmed aseptically, and portions weighing approximately 50 g (4 cm×4 cm×3 cm) were cut out from the center of the block. To the excised samples of approximately 50 g, an equivalent amount of PBS was added, followed by a 30-second Stomacher treatment, and an equivalent amount of squeezed-out liquid was prepared. The squeezed-out liquids were each used at 100 μL to inoculate the CT-SMAC medium, and this was incubated under aerobic conditions at 37° C. for one day. The obtained EHEC-like colonies were counted to verify the variability and evenness of internal contamination by the artificially injected bacteria (Table 6).

Result

When EHEC O157 was infused into the bile duct and its distribution was observed, while some regional differences were seen, the bacteria were found to be evenly distributed throughout nearly all regions at approximately $10^5$ cfu for every 1 g of liver.

TABLE 6

Distribution of the injected bacteria in the liver

| Liver No. | Site No. | Weight (g) | cfu/g | Liver No. | Site No. | Weight (g) | cfu/g |
|---|---|---|---|---|---|---|---|
| 1 | 1 | 35 | $1.95 \times 10^5$ | 2 | 1 | 34.1 | $1.31 \times 10^5$ |
|  | 2 | 45.3 | $8.60 \times 10^4$ |  | 2 | 49.5 | $1.21 \times 10^5$ |
|  | 3 | 47.3 | $2.18 \times 10^4$ |  | 3 | 40.5 | $2.28 \times 10^5$ |
|  | 4 | 30.7 | $1.31 \times 10^4$ |  | 4 | 43.7 | $3.62 \times 10^5$ |
|  | 5 | 53 | $6.94 \times 10^4$ |  | 5 | 44 | $5.80 \times 10^4$ |
|  | 6 | 44 | $5.06 \times 10^4$ |  | 6 | 45.2 | $9.34 \times 10^4$ |
|  | 7 | 57.8 | $1.19 \times 10^5$ |  | 7 | 60.1 | $1.59 \times 10^5$ |
|  | 8 | 40.2 | $>6.00 \times 10^4$ |  | 8 | 47.9 | $1.11 \times 10^5$ |
|  | 9 | 42.9 | $9.46 \times 10^4$ |  | 9 | 36 | $1.51 \times 10^5$ |

Example 7

Sterilizing Effects of Each Chlorine-Based Disinfectant

Sterilizing effects were examined using generally commercially available chlorine-based disinfectants having different properties.

Method

Twenty mL of $3\times10^6$ cfu/mL EHEC O157 was infused into the bile duct. After this was left undisturbed for ten minutes, approximately 150 mL of warm water (approximately 85° C.) was infused at high pressure (0.2 MPa) into the bile duct for washing. This operation was repeated. Furthermore, approximately 50 mL of warm water (approximately 85° C.) was infused at high pressure (0.2 MPa) into the portal vein for washing.

Then, approximately 500 mL of a chlorine-based disinfectant V-INAC (registered trademark, Lupinas) (500 ppm) (Table 8); Eva Water (registered trademark, Evatec Co., Ltd.) (500 ppm) (Table 9), or Teruron Bleach (500 ppm) (Table 10) was infused at high pressure (0.2 MPa) into the bile duct for disinfection. Furthermore, the group in which infusion of approximately 300 mL of V-INAC was followed by infusion of approximately 300 mL of Eva Water (Table 11) was also examined. After infusion of the disinfectant, the surface of the liver was disinfected by spraying 400 ppm of chlorine-based disinfectant Teruron Bleach and 80% ethanol. Subsequently, a knife or scalpel disinfected with hot water and alcohol was used to cut out blocks of approximately 100 cm³ from four sites (A to D) in the left lobe. Two samples (for example, A1 and A2) weighing approximately 50 g (4 cm×4 cm×3 cm) were cut out from the center of each block (FIG. 8). One of the samples was rapidly frozen at −35° C., and stored for 28 hours. Then, the sample was thawed gently at 4° C., and stored at 4° C. for 16 hours. To the excised sample of approximately 50 g, an equivalent amount of PBS was added, followed by a 30-second Stomacher treatment; and an equivalent amount of squeezed-out liquid was prepared. The squeezed-out liquids were each inoculated at 100 μL into CT-SMAC medium, and this was incubated under aerobic conditions at 37° C. for one day. The obtained EHEC-like colonies were counted, and the sterilizing effects of chlorine-based disinfectants on internal infection were examined (Tables 8 to 11).

Results

Sterilizing effects against the infused bacteria were examined using chlorine-based disinfectants each having different properties: V-INAC (CC cluster formulation), Eva water (aqueous hypochlorous acid produced by buffer method), and Teruron Bleach (chlorine-based bactericidal agent, bleach). As a result, while there are individual differences, disinfection by a single chlorine-based disinfectant only reduced the number of bacteria to approximately ½ to 1/10 per 1 g of liver, regardless of the type of chlorine-based disinfectant used. However, when a freezing treatment was added to the chlorine treatment, reduction to approximately 1/1000 to 1/5000 or so was accomplished in all groups; and in the case of strongest disinfection effect, the number of bacteria was reduced to 10 cells or so per 1 g of liver. Furthermore, effects of the combined use of different chlorine-based disinfectants were examined, but synergistic effects were not observed particularly by the combined use of V-INAC which is a CC cluster formulation, with Eva water which is an aqueous hypochlorous acid produced by buffer method.

The characteristics of each chlorine-based disinfectant are shown in Table 7.

TABLE 7

Characteristics of each chlorine-based disinfectant

| Name | Ingredient, method of production, and such | Characteristics |
|---|---|---|
| Teruron Bleach | Sodium hypochlorite (5-12% solution) | Strongly basic (pH 12.5-13.5). Weakly basic (pH 8-10) when diluted to 50-200 ppm. |
| V-INAC Shiten Clean K guard | Contains sodium chlorite. sodium hypochlorite, sodium carbonate, caustic soda, sodium bicarbonate, and salt. | Weakly basic (pH 8-9). By prodrug modification of a plurality of chlorines, the actions were intensified and problems such as toxicity and smell were improved. Stabilized chlorine complex formulation that maximizes the intrinsic bacteria-eliminating power of chlorine. |
| Eva water | Weakly acidic activated hypochlorite water. Produced by buffer method. (Japanese Patent Application No. 2011-136770) | Weakly acidic (pH 4~7). Weakly acidic aqueous hypochlorous acid solution can be produced without generating chlorine gas and without using acid. |

Example 8

Disinfection Effects of Different Freezing Temperatures and Thawing Temperatures The effect of different freezing temperatures and thawing temperatures on disinfection effects was examined.

Method

Twenty mL of $1\times10^6$ cfu/mL EHEC O157 was infused into the bile duct. Subsequently, approximately 150 mL of warm water (approximately 85° C.) was infused at high pressure (0.2 MPa) into the bile duct for washing. This operation was repeated. Furthermore, approximately 50 mL of warm water (approximately 85° C.) was infused at high pressure (0.2 MPa) into the portal vein for washing.

Then, approximately 500 mL of V-INAC was infused at high pressure (0.2 MPa) into the bile duct for disinfection. After disinfection, the surface of the liver was disinfected by spraying 400 ppm of Teruron Bleach and 80% ethanol. Subsequently, a knife or scalpel disinfected with hot water and alcohol was used to cut out blocks of approximately 80 $cm^3$ from five sites (A to E) in the left lobe. Samples weighing approximately 50 g (4 cm×4 cm×3 cm) were cut out from the center of each block. The excised samples were placed in sterile bags, and were vacuum packaged to a vacuum of approximately −0.1 MPa or so (approximately −0.07 to −0.09 MPa or so) over a course of approximately 30 seconds to one minute by using a table-top vacuum packaging machine (DZ-300, Askworks). The vacuum packaged samples were divided into three groups: group not subjected to freezing, group subjected to rapid freezing at −30° C., and group subjected to rapid freezing at −196° C. After freezing, the samples were stored for 28 hours, and then gently thawed in ice water (0° C.) and at 4° C., and stored for 16 hours at 0° C. and 4° C., respectively. The group without freezing treatment was immediately subjected to the next operation. To each of the thawed samples weighing approximately 50 g, an equivalent amount of PBS was added, and a 30-second Stomacher treatment was performed. An equivalent amount of squeezed-out liquid was prepared. The squeezed-out liquids were each inoculated at 100 μL into the CT-SMAC medium, and this was incubated under aerobic conditions at 37° C. for one day. The obtained EHEC-like colonies were obtained, and influences of the freezing temperature and thawing temperature were examined (Table 12).

Results

When influence of differences in the freezing temperature and thawing temperature on disinfection effects was investigated, differences due to variation in freezing temperature were not so clearly observed; however, in the group subjected to freezing at −196° C., the number of bacteria tended to be low. Regarding variation in the thawing temperature, the effect was not observed in some groups, but thawing in ice water (0° C.) tended to be more effective than thawing at 4° C. On the other hand, in the non-disinfected group, freezing and thawing only reduced the number of bacterial cells by about 1/10.

TABLE 12

Influence of different freezing temperatures and thawing temperatures on disinfection effects

| Disinfection treatment | Liver No. | Freezing | Thawing | Site | cfu/g |
|---|---|---|---|---|---|
| V-INAC 500 ppm 500 mL | 1 | None | None | A | $2.1 \times 10^2$ |
| | | −30° C. | 4° C. | B | $2.3 \times 10^2$ |
| | | | 0° C. | C | $9.8 \times 10^1$ |
| | | −196° C. | 4° C. | D | $3.7 \times 10^1$ |
| | | | 0° C. | E | $5.5 \times 10^1$ |
| V-INAC 500 ppm 500 mL | 2 | None | None | A | $3.8 \times 10^3$ |
| | | −30° C. | 4° C. | B | $2.9 \times 10^1$ |
| | | | 0° C. | C | 2.7 |
| | | −196° C. | 4° C. | D | $1.4 \times 10^1$ |
| | | | 0° C. | E | 2.0 |
| None | 3 | None | None | A | $6.2 \times 10^3$ |
| | | −30° C. | 4° C. | B | $4.6 \times 10^2$ |
| | | | 0° C. | C | $>6.0 \times 10^2$ |
| | | −196° C. | 4° C. | D | $>6.0 \times 10^2$ |
| | | | 0° C. | E | $>6.0 \times 10^2$ |

Example 9

Additional Disinfection Effects by a Freezing Step and a Liquid- and Moisture-Absorbing Material that Contains a Chlorine-Based Disinfectant Sterilizing effects of additional disinfection by a freezing step and by the use of a liquid- and moisture-absorbing material that contains a chlorine-based disinfectant were examined.

Method

Twenty mL of $1 \times 10^7$ cfu/mL EHEC O157 was infused into the bile duct. Subsequently, approximately 150 mL of warm water (approximately 85° C.) was infused at high pressure (0.2 MPa) into the bile duct for washing. This operation was repeated. Furthermore, approximately 50 mL of warm water (approximately 85° C.) was infused at high pressure (0.2 MPa) into the portal vein for washing.

Then, approximately 500 mL of Eva water was infused at high pressure (0.2 MPa) into the bile duct for disinfection. After disinfection, the surface of the liver was disinfected by spraying 400 ppm of Teruron Bleach and 80% ethanol. Subsequently, a knife or scalpel disinfected with hot water and alcohol was used to cut out blocks of approximately 80 cm$^3$ from three sites (A to C) in the left lobe. Samples weighing approximately 50 g (4 cm×4 cm×3 cm) were cut out at two sites from the center of each block (FIG. 9). The excised samples were placed in sterile bags, and a liquid- and moisture-absorbing material ((Dripkeeper, approximately 9 cm×15 cm) (registered trademark, distributor: Japan Vilene Co., Ltd.)) containing approximately 10 mL of 500 ppm Eva water was also put into the bags. The samples were vacuum packaged to a vacuum of approximately −0.1 MPa or so (approximately −0.07 to −0.09 MPa or so) over a course of approximately 30 seconds to one minute by using a table-top vacuum packaging device. Each of the vacuum packaged samples was rapidly frozen at −30° C., stored for 28 hours, and then gently thawed at 4° C. over a course of 16 hours. The group without freezing treatment was subjected to the next operation immediately. To each of the thawed samples weighing approximately 50 g, an equivalent amount of PBS was added, followed by a 30-second Stomacher treatment; and an equivalent amount of squeezed-out liquid was prepared. The squeezed-out liquids were each inoculated at 100 μL into the CT-SMAC medium, and this was incubated under aerobic conditions at 37° C. for one day. The obtained EHEC O157-like colonies were counted, and influences of the freezing temperature and Dripkeeper were examined (Table 13).

Results

In addition to the infusion of a disinfectant and a freeze-thaw disinfection step, Dripkeeper, often used as an absorber for meat juice, was soaked with a chlorine-based disinfectant and used to additionally disinfect blocks of liver meat. Additional disinfection using a chlorine-based disinfectant-containing Dripkeeper was able to reduce the number of bacteria by ½ to ⅕ compared to the normal disinfection. Furthermore, a sample not subjected to freezing treatment after infusion of a disinfectant was additionally disinfected by a chlorine-based disinfectant-containing Dripkeeper, and this showed a decreasing trend in the number of bacteria.

TABLE 13

Additional disinfection effect by chlorine-based disinfectant-containing Dripkeeper

| Disinfection treatment | Liver No. | Freezing | Dripkeeper containing chlorine-based disinfectant | Site | cfu/g |
|---|---|---|---|---|---|
| Eva water 2,000 ppm 500 mL | 1 | None | − | A1 | 22,360 |
| | | | + | A2 | 12,160 |
| | | −30° C. | − | B1 | 118 |
| | | | + | B2 | 56 |
| | | | − | C1 | 141 |
| | | | + | C2 | 30 |
| Eva water 500 ppm 500 mL | 2 | None | − | A1 | 12,680 |
| | | | + | A2 | >6,000 |
| | | −30° C. | − | B1 | 680 |
| | | | + | B2 | 553 |
| | | | − | C1 | 590 |
| | | | + | C2 | 185 |
| Eva water 500 ppm 500 mL | 3 | None | − | A1 | 4,087 |
| | | | + | A2 | 11,600 |
| | | −30° C. | − | B1 | 71 |
| | | | + | B2 | 13 |
| | | | − | C1 | 25 |
| | | | + | C2 | 7 |

Example 10

Additional Disinfection Effects by Addition of a Chlorine-Based Disinfectant Sterilizing effects of additional disinfection by addition of a chlorine-based disinfectant were examined.

Method

Twenty mL of $1 \times 10^7$ cfu/mL EHEC was infused into the bile duct. Subsequently, approximately 150 mL of warm water (approximately 85° C.) was infused at high pressure (0.2 MPa) into the bile duct for washing. This operation was repeated. Furthermore, approximately 50 mL of warm water (approximately 85° C.) was infused at high pressure (0.2 MPa) into the portal vein for washing.

Then, approximately 500 mL of Eva water (2,000 ppm) was infused at high pressure (0.2 MPa) into the bile duct for disinfection. After disinfection, the surface of the liver was disinfected by spraying 400 ppm of a chlorine-based disinfectant Teruron Bleach and 80% ethanol. Subsequently, a knife or scalpel disinfected with hot water and alcohol was used to cut out blocks of approximately 100 cm$^3$ from three sites (A to C) in the left lobe. Samples weighing approximately 50 g (4 cm×4 cm×3 cm) were cut out at two sites from the center of each block (FIG. 9). The excised samples were placed in sterile bags, approximately 10 mL of 2,000 ppm Eva water was also put into the bags, and they were vacuum packaged to a vacuum of approximately −0.1 MPa or so (approximately −0.07 to −0.09 MPa or so) over a course of approximately 30 seconds to one minute by using a table-top vacuum packaging device. Each of the vacuum packaged samples was rapidly frozen at −30° C., stored for 28 hours, and then gently thawed at 4° C. over a course of 16 hours. The group that did not undergo the freezing treatment was subjected to the next operation immediately. To each of the thawed samples weighing approximately 50 g, an equivalent amount of PBS was added, followed by a 30-second Stomacher treatment; and an equivalent amount of squeezed-out liquid was prepared. The squeezed-out liquids were each inoculated at 100 μL into the CT-SMAC medium, and this was incubated under aerobic conditions at 37° C. for one day. The obtained EHEC-like colonies were counted, and additional disinfection effects by Eva water were examined (Table 14).

Results

When a chlorine-based disinfectant was added instead of additional disinfection by a chlorine-based disinfectant-containing liquid- and moisture-absorbing material, and vacuum packaging was carried out, similar effects were observed and the number of bacteria was reduced by ½ to ¹⁄₁₀ or so.

TABLE 14

Effects of additional disinfection by Eva water

| Disinfection treatment | Liver No. | Freezing | Additional disinfection | Site | cfu/g |
|---|---|---|---|---|---|
| Eva water 2,000 ppm 500 mL | 1 | None | − | A1 | >6,000 |
| | | | + | A2 | >6,000 |
| | | −30° C. | − | B1 | 125 |
| | | | + | B2 | 42 |
| | | | − | C1 | 56 |
| | | | + | C2 | 22 |
| Eva water 2,000 ppm 500 mL | 2 | None | − | A1 | 1,860 |
| | | | + | A2 | 4,320 |
| | | −30° C. | − | B1 | 0 |
| | | | + | B2 | 0 |
| | | | − | C1 | 3 |
| | | | + | C2 | 1 |
| Eva water 2,000 ppm 500 mL | 3 | None | − | A1 | >6,000 |
| | | | + | A2 | >6,000 |
| | | −30° C. | − | B1 | 173 |
| | | | + | B2 | 16 |
| | | | − | C1 | 47 |
| | | | + | C2 | 21 |

Example 11

Additional Disinfection Effects by a Stabilized Chlorine Complex Formulation

Sterilizing effects of additional disinfection by K Guard, a stabilized chlorine complex formulation, were examined.

Method

Twenty mL of $1\times10^7$ cfu/mL EHEC O157 was infused into the bile duct. Subsequently, approximately 150 mL of warm water (approximately 85° C.) was infused at high pressure (0.2 MPa) into the bile duct for washing. This operation was repeated. Furthermore, approximately 50 mL of warm water (approximately 85° C.) was infused at high pressure (0.2 MPa) into the portal vein for washing.

Then, approximately 500 mL of K Guard (product name, Eight Knot, Inc.) (200 ppm) was infused at high pressure (0.2 MPa) into the bile duct for disinfection. After disinfection, the surface of the liver was disinfected by spraying 400 ppm of a chlorine-based disinfectant Teruron Bleach and 80% ethanol. Subsequently, a knife or scalpel disinfected with hot water and alcohol was used to cut out blocks of approximately 100 cm³ from three sites (A to C) in the left lobe. Samples weighing approximately 50 g (4 cm×4 cm×3 cm) were cut out at two sites from the center of each block (FIG. 9). The excised samples were placed in sterile bags, approximately 10 mL of K Guard (200 ppm) was also put into the bags, and they were vacuum packaged to a vacuum of approximately −0.1 MPa or so (approximately −0.07 to −0.09 MPa or so) over a course of approximately 30 seconds to one minute by using a table-top vacuum packaging device. Each of the vacuum packaged samples was rapidly frozen at −30° C., stored for 28 hours, and then gently thawed at 4° C. over a course of 16 hours. The group that did not undergo the freezing treatment was subjected to the next operation immediately. To each of the thawed samples weighing approximately 50 g, an equivalent amount of PBS was added, followed by a 30-second Stomacher treatment; and an equivalent amount of squeezed-out liquid was prepared. The squeezed-out liquids were each inoculated at 100 μL into the CT-SMAC medium, and this was incubated under aerobic conditions at 37° C. for one day. The obtained EHEC-like colonies were counted, and effects of disinfection and additional disinfection using K Guard were examined (Table 15).

Results

Whether the chlorine-based disinfectant K guard, which is called a stabilized chlorine complex formulation, shows effects similar to those of other disinfectants was examined. The result confirmed a strong sterilizing effect by K Guard.

TABLE 15

Disinfection effects by K guard

| Disinfection treatment | Liver No. | Freezing | Additional disinfection | Site | cfu/g |
|---|---|---|---|---|---|
| K Guard 200 ppm 500 mL | 1 | None | − | A1 | 8,840 |
| | | | + | A2 | 14,640 |
| | | −30° C. | − | B1 | 8 |
| | | | + | B2 | 2 |
| | | | − | C1 | 6 |
| | | | + | C2 | 4 |
| K Guard 200 ppm 500 mL | 2 | None | − | A1 | 2,520 |
| | | | + | A2 | 1,850 |
| | | −30° C. | − | B1 | 8 |
| | | | + | B2 | 12 |
| | | | − | C1 | 10 |
| | | | + | C2 | 8 |
| K Guard 200 ppm 500 mL | 3 | None | − | A1 | 22,680 |
| | | | + | A2 | 30,080 |
| | | −30° C. | − | B1 | 114 |
| | | | + | B2 | 70 |
| | | | − | C1 | 92 |
| | | | + | C2 | 86 |

Disinfecting the surface and the inside with a chlorine-based disinfectant and additional freezing and thawing was found to enable substantial sterilization against food poisoning-causing microorganisms that are present inside and outside the liver. It was found that the chlorine-based disinfectant not only decreases the number of bacteria in the liver, but also changes the morphology of EHEC O157 colonies from smooth to rough. This indicates that the chlorine-based disinfectant may have at least caused certain damage to the bacteria if it did not killed them. In fact, chlorine-based disinfectants have been reported to cause changes in the surface structure of the *E. coli* membrane. As a result of this damage, stress due to freezing may have acted synergistically.

Furthermore, in rare cases, relatively high concentrations ($10^6$ cfu/mL or more) of *E. coli*-like bacteria and *Campylobacter* were found to be present in food, particularly in bovine liver (in bile). When the concentration of bacteria is high, the disinfection effect may be reduced. Food materials used for raw consumption or in cooking methods that carry out not-so-intense heating, such as rare steaks, the number of bacteria present in the food materials may have to be monitored by a certain method. In the case of liver, it may be most suitable to monitor the number of bacteria in bile by direct culturing, PCR, and such.

Furthermore, food materials that were disinfected, frozen, and thawed according to the method of the present invention were not affected in taste and such; and their smell, peculiarity, and such, which are the drawbacks of such food materials, were reduced, and the taste and flavor were rather improved. Therefore, this invention could be a great contribution to conventional methods for processing, distributing, and selling foods, particularly meats for raw consumption such as raw liver.

INDUSTRIAL APPLICABILITY

The present invention provides sterilization methods against microorganisms present in the liver, bile ducts, or blood vessels. With these methods, it is possible to reduce the risk of food poisoning associated with consumption of raw liver, which is caused by microorganisms such as *Campylobacter* and enterohemorrhagic *Escherichia coli*. The methods of the present invention are useful in providing foods with reduced risk of food poisoning or in the field of distribution of such foods.

The liver obtained according to the methods of the present invention was not affected in taste or such at all. Therefore, the present invention is useful in the areas of processing, distribution, and selling of meat for raw consumption.

It is also useful in preserving Japanese food culture.

The invention claimed is:

1. A method for killing microorganisms present in a bile duct and in a portal vein of a liver, which comprises the steps of:
    (a) infusing hot water into both the bile duct and the portal vein of a liver removed from a non-human animal, wherein the hot water has a temperature from 55° C. to 90° C., and the pressure is from 0.05 MPa to 0.5 MPa;
    (b) infusing a first chlorine-based disinfectant into both the bile duct and the portal vein of the liver of step (a), wherein the first chlorine-based disinfectant is selected from the group consisting of:
        (i) an aqueous hypochlorous acid having a pH of 4 to 7,
        (ii) a composition comprising sodium hypochlorite with a pH of 8 to 10, and
        (iii) a composition comprising sodium chlorite, sodium hypochlorite, sodium carbonate, caustic soda, and sodium bicarbonate with a pH of 8 to 9,
    (c) infiltrating the liver with said first chlorine-based disinfectant or a second chlorine-based disinfectant, wherein the second chlorine-based disinfectant is also selected from the group consisting of:
        (i) an aqueous hypochlorous acid having a pH of 4 to 7,
        (ii) a composition comprising sodium hypochlorite with a pH of 8 to 10, and
        (iii) a composition comprising sodium chlorite, sodium hypochlorite, sodium carbonate, caustic soda, and sodium bicarbonate with a pH of 8 to 9,
    (d) freezing the liver, and
    (e) thawing the liver.

2. The method of claim 1, wherein the microorganisms cause food poisoning.

3. The method of claim 2, wherein the microorganism that causes food poisoning is a microorganism selected from the group consisting of *Campylobacter*, pathogenic *Escherichia coli, Salmonella, Shigella, Aeromonas*, and *Staphylococcus*, and hepatitis E virus.

4. A sterilized liver tissue obtained by the method of claim 1.

* * * * *